US012802078B2

(12) United States Patent
Lentz et al.

(10) Patent No.: US 12,802,078 B2
(45) Date of Patent: Nov. 17, 2026

(54) GENERATING USER INTERFACES COMPRISING A UNIVERSAL DYNAMIC BASE LIMIT VALUE REFLECTING TRANSACTIONS WITHIN ONE OR MORE TRANSACTION ACCOUNTS

(71) Applicant: Chime Financial, Inc., San Francisco, CA (US)

(72) Inventors: Taylor Lentz, South Lake Tahoe, CA (US); Tyler Dibble, San Rafael, CA (US); Melissa Hamilton, San Francisco, CA (US); Dennis Jiang, San Francisco, CA (US); Michael Homnick, San Francisco, CA (US); Andrew Nguyen, San Francisco, CA (US); Deedee Chiang, Vancouver, WA (US); Yuzhou Zou, Brooklyn, NY (US); Michael Ngo, South San Francisco, CA (US); Belinda Liu, San Francisco, CA (US); Johny Lam, Castro Valley, CA (US); Matthew McCormick, San Francisco, CA (US); Aashna Agarwal, Mountain View, CA (US); Alitsiya Yusupova, Burlingame, CA (US); Akhil Naini, San Francisco, CA (US); Gonzalo Sosa Rolon, Jersey City, NJ (US); Shigeki Hirose, Des Moines, WA (US); Danko Miocevic, Vancouver (CA)

(73) Assignee: Chime Financial, Inc., San Francisco, CA (US)

( * ) Notice: Subject to any disclaimer, the term of this patent is extended or adjusted under 35 U.S.C. 154(b) by 24 days.

(21) Appl. No.: 18/515,767

(22) Filed: Nov. 21, 2023

(65) Prior Publication Data

US 2025/0165983 A1 May 22, 2025

(51) Int. Cl.
*G06Q 20/40* (2012.01)
*G06Q 20/24* (2012.01)

(52) U.S. Cl.
CPC .......... *G06Q 20/405* (2013.01); *G06Q 20/24* (2013.01)

(58) Field of Classification Search
CPC ............................ G06Q 20/405; G06Q 20/24
See application file for complete search history.

(56) References Cited

U.S. PATENT DOCUMENTS

| | | | | |
|---|---|---|---|---|
| 2019/0066202 | A1* | 2/2019 | Cervenka | G06Q 20/405 |
| 2023/0139364 | A1 | 5/2023 | Vemulapally et al. | |

* cited by examiner

*Primary Examiner* — Edward Chang
(74) *Attorney, Agent, or Firm* — Nicholson De Vos Webster & Elliott LLP

(57) ABSTRACT

The disclosure describes embodiments of systems, methods, and non-transitory computer readable storage media that determine, track, modify, and display a base limit value across digital transactions detected on multiple connected accounts corresponding to a user account. Indeed, the disclosed systems can determine an available base limit value for a user account. Furthermore, the disclosed systems can utilize a transaction value limit (based digital deposit transactions), in a secured credit account, to enable digital transactions. In addition, the disclosed systems can detect digital transactions and utilize the universal base limit value to enable a digital transaction that exceeds a transaction value limit. Moreover, the disclosed systems can display updates to the base limit value and the transaction value limit based on digital transactions across multiple connected accounts. Additionally, the disclosed systems can also authorize digital transactions based on tracked updates to the universal base limit value and the transaction value limit.

19 Claims, 23 Drawing Sheets

GENERATING USER INTERFACES COMPRISING A UNIVERSAL DYNAMIC BASE LIMIT VALUE REFLECTING TRANSACTIONS WITHIN ONE OR MORE TRANSACTION ACCOUNTS

BACKGROUND

Recent years have seen a significant development in systems that utilize web-based and mobile-based applications to manage user accounts and digital information for user accounts in real time. For example, many conventional applications provide various graphical user interfaces (GUIs) to present digital information and options to client devices. This often includes determining or calculating account-specific values or limits and communicating such information via the web-based and mobile-based applications. Although conventional systems attempt to determine and communicate digital information to user accounts on web-based and mobile-based applications, such conventional systems face a number of technical shortcomings, particularly with regard to the flexibility and efficiency of user interfaces that display obscure, non-transparent outputs from computer-based models and other user transactions.

For example, many conventional systems utilize computer-based models that act as a black box mechanism and, as a result, provide outputs that are difficult to navigate within a GUI. For instance, conventional systems oftentimes utilized computer-based models that analyze a large number of variables and, without providing an understandable reasoning, generate a prediction or determination. Accordingly, many conventional systems are limited to rigid GUIs that are unable to provide insight into both determinations and how future or predicted actions will impact determinations of the computer-based models.

In addition, many conventional systems inefficiently utilize computational resources due to computer-based model outputs and the resulting inflexible user interfaces. For example, conventional systems often require navigation between multiple user interfaces to understand an output of a computer-based model and also to understand future actions (or behaviors) that would yield a particular outcome from the computer-based model. Indeed, in addition to receiving an obscure output from a computer-based model, many conventional systems fail to accurately visualize outputs from the computer-based models while also providing insight into the output within limited screen spaces of GUIs in mobile devices.

Furthermore, conventional systems oftentimes are also unable to provide insight into impacts on user account values resulting from various digital transactions (when the digital transactions occur across multiple connected accounts). For example, conventional systems oftentimes are unable to efficiently present (or display) effects of a digital transaction in a particular function or account related to a user across multiple connected user accounts within a single graphical user interface (e.g., within a limited screen space of a mobile device). In some cases, such conventional systems also require substantial, inefficient navigation between multiple user interfaces to determine (or understand) an effect of a digital transaction on one or more connected accounts of a user.

Additionally, conventional systems are often unable to track digital transactions over multiple connected accounts and/or across user account values applicable to the connected accounts. In particular, many conventional systems often inaccurately authorize digital transactions when the digital transaction affects multiple connected accounts of a user. Furthermore, in many instances, many conventional systems are unable to quickly check digital transactions when the digital transaction affects multiple connected accounts of a user in real time (or near-real time). In particular, due to inaccuracies in authorizations and slowdowns in authorizations, many conventional systems are unable to authorize digital transactions that are dependent on multiple connected accounts or account values in real time and/or near-real time.

Furthermore, many conventional systems are unable to accurately determine account-specific values or limits through computer models. For example, conventional systems fail to accurately determine account-specific limits that accurately reflect underlying risks based on numerous factors or variables corresponding to digital accounts.

SUMMARY

This disclosure describes one or more embodiments of systems, computer-implemented methods, and non-transitory computer readable media that provide benefits and solve one or more of the foregoing or other problems by dynamically determining, tracking, modifying, and displaying a base limit value across digital transactions detected on multiple connected accounts corresponding to a user account. For instance, the disclosed systems can utilize a variety of machine learning models and a base limit value model to generate user interface elements that transparently and efficiently present current and future base limit values for user accounts reflecting a value limit for excess account withdrawals. Furthermore, the disclosed systems can utilize a transaction value limit (based on one or more digital deposit transactions), in a secured credit account, to enable and authorize digital transactions (e.g., in relation to the transaction value limit). In addition, the disclosed systems can detect one or more digital transactions and utilize the universal base limit value (that is accessible between multiple connected accounts) to enable a digital transaction that exceeds a transaction value limit. Indeed, the disclosed systems can efficiently and accurately display updates to the base limit value and the transaction value limit based on digital transactions across multiple connected accounts. Additionally, the disclosed systems can also accurately and quickly authorize digital transactions based on tracked updates to the base limit value across the multiple connected accounts and the transaction value limit.

BRIEF DESCRIPTION OF THE DRAWINGS

The detailed description is described with reference to the accompanying drawings in which.

DETAILED DESCRIPTION

Figure 1:
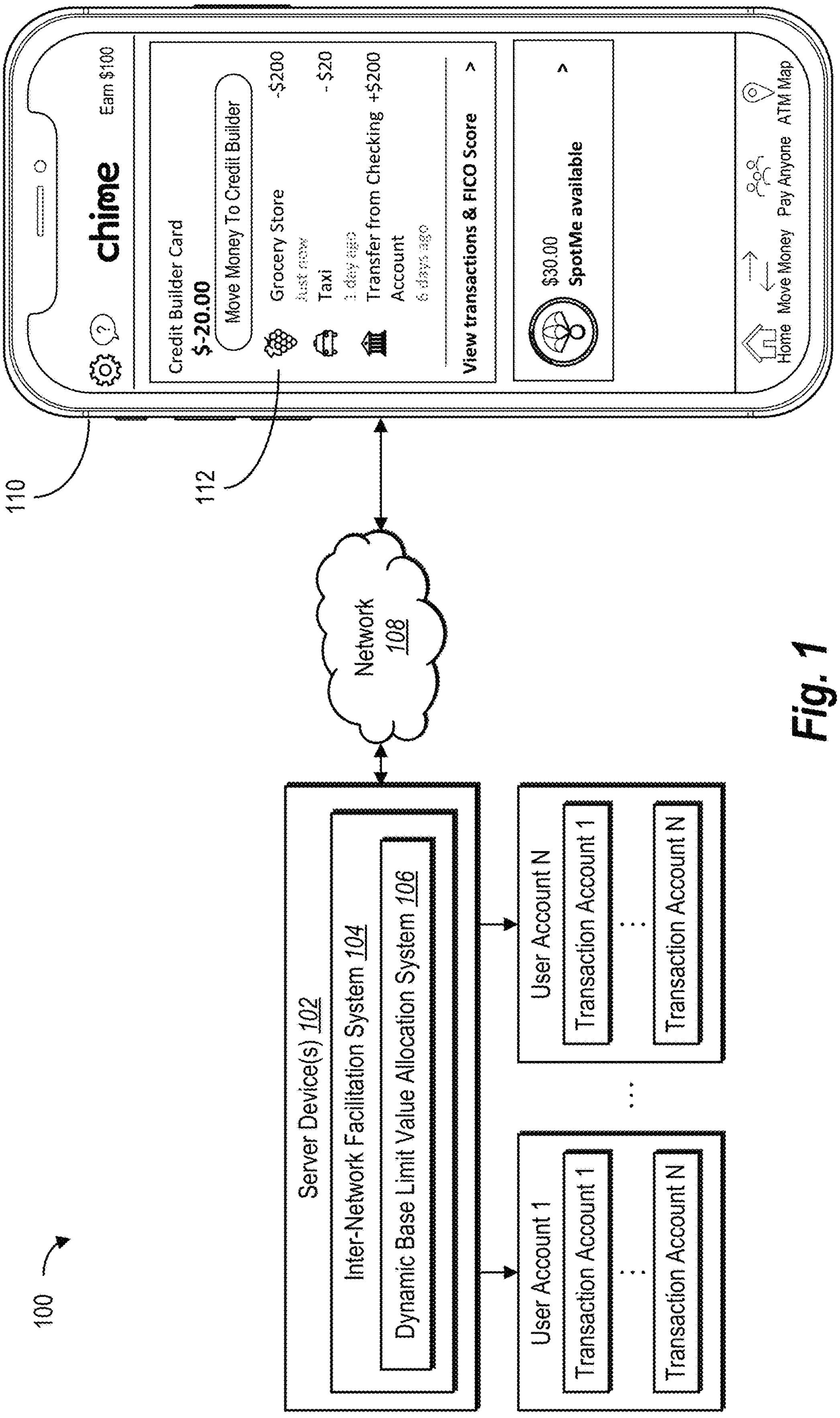
FIG. 1 illustrates a schematic diagram of an environment for implementing an inter-network facilitation system and a dynamic base limit value allocation system in accordance with one or more implementations.

The disclosure describes on or more embodiments of a dynamic base limit value allocation system that dynamically determines and displays a base limit value in relation to digital transactions detected on multiple connected accounts corresponding to a user account (utilizing a transaction value limit). In one or more implementations, the dynamic base limit value allocation system utilizes a variety of machine learning models and a base limit value model to generate user interface elements that transparently and efficiently present current and future base limit values for user accounts (that is accessible to multiple connected accounts). Furthermore, the dynamic base limit value allocation system also, upon detecting a digital transaction, utilizes the base limit value to fulfill a remainder between a transaction value of the digital transaction and a transaction value limit corresponding to a particular transaction account from the multiple connected accounts. Indeed, the dynamic base limit value allocation system can efficiently display modifications to the base limit value (based on digital transactions across the multiple connected accounts) and a modified transaction value limit for a particular transaction account. Furthermore, the dynamic base limit value allocation system can also quickly and accurately authorize a digital transaction in comparison to the universally accessible base limit value and the transaction value limit.

Indeed, the dynamic base limit value allocation system can utilize various machine learning models and a dynamic base limit value model to generate user interface elements that transparently and efficiently present determined base limit values, subsequent base limit values, and user activity conditions within a graphical user interface. For example, the dynamic base limit value allocation system can select an activity machine learning model from multiple activity machine learning models utilizing a user activity duration corresponding to a user account. In addition, the dynamic base limit value allocation system can generate an activity score for the user account by utilizing the selected activity machine learning model and user activity data of the user account.

Furthermore, the dynamic base limit value allocation system can determine a base limit value from the activity score using a base limit value model. Moreover, the dynamic base limit value allocation system can also utilize the base limit value model to determine a subsequent base limit value and user activity conditions that achieve the subsequent base limit value. Additionally, in one or more embodiments, the dynamic base limit value allocation system generates and displays user interface elements to transparently and efficiently present base limit values (and subsequent base limit values and user activity conditions).

Moreover, the dynamic base limit value allocation system can utilize a transaction value limit to facilitate digital transactions. For example, the dynamic base limit value allocation system can generate and display a transaction value limit utilizing one or more detected deposit transactions within a secured credit account. Furthermore, in one or more instances, the dynamic base limit value allocation system detects a digital transaction corresponding to the secured credit account to authorize (e.g., authorize and/or reject) the digital transaction. Moreover, the dynamic base limit value allocation system can utilize the transaction value limit to fulfill a transaction value corresponding to the digital transaction and display a modified transaction value limit.

In addition, the dynamic base limit value allocation system can utilize a universally accessible (via multiple connected transaction accounts) base limit value with the transaction value limit to enable one or more digital transactions within the secured credit account. For example, upon detecting a digital transaction corresponding to the secured credit account exceeds a transaction value limit, the dynamic base limit value allocation system utilizes the base limit value to fulfill a remainder between a transaction value of the digital transaction and the transaction value limit. In addition, the dynamic base limit value allocation system can modify the base limit value and the transaction value limit in response to fulfilling the digital transaction and display the modified base limit value and the modified transaction value limit.

Additionally, in one or more instances, the dynamic base limit value allocation system displays the modified base limit value across multiple connected accounts. Indeed, by updating the modified base limit value, the dynamic base limit value allocation system can utilize an accurate (modified) base limit value to utilize the modified base limit value to fulfill various digital transactions in the multiple connected accounts. Indeed, the dynamic base limit value allocation system can display an updated modified base limit value (in addition to the transaction value limit for the secured credit account) when the base limit value is utilized in one or more other connected transaction accounts.

Furthermore, in some embodiments, the dynamic base limit value allocation system also utilizes the transaction value limit and the base limit value to authorize one or more digital transactions (accurately and quickly). For instance, upon detecting a digital transaction, the dynamic base limit value allocation system can compare the transaction value of the digital transaction to a combination of the universally accessible base limit value and the transaction value limit. Indeed, upon determining that the transaction value of the digital transaction exceeds the combination of the universally accessible base limit value and the transaction value limit, the universally accessible base limit value and the transaction value limit can reject the digital transaction. In addition, upon determining that the transaction value of the digital transaction does not exceed the combination of the universally accessible base limit value and the transaction value limit, the universally accessible base limit value and the transaction value limit can authorize the digital transaction.

In one or more implementations, the dynamic base limit value allocation system utilizes the base limit value to fulfill a remainder between a transaction value of the digital transaction and the transaction value limit in a secured credit account in a two-phase process. In particular, upon detecting a transaction with a transaction value that exceeds the transaction value limit of the secured credit account, the dynamic base limit value allocation system can determine that the base limit value accessible by the user account covers the excess of the transaction value. In response to this determination, the dynamic base limit value allocation system can authorize the transaction and reserve a portion of the base limit value to cover the excess of the transaction value. Furthermore, at the time (or near the time) at which a user payment is processed for a balance on the secured credit account (e.g., using the transaction value limit generated from user received deposits in a secured deposit account of the secured credit account), the dynamic base limit value allocation system can utilize the reserved portion of the base limit value to cover the excess balance on the secured credit account.

The dynamic base limit value allocation system can provide numerous advantages, benefits, and practical applications relative to conventional systems. For example, unlike conventional systems that often utilize computer-based models that provide outputs in difficult to navigate GUIs, the dynamic base limit value allocation system can utilize various machine learning models and base limit value models to determine and provide current and future base limit values together with information for achieving the future base limit values. In certain instances, the dynamic base limit value allocation system can generate flexible user interfaces that provide transparency and insight into a combined machine learning model and base value model that utilizes various variables to determine base limit values, subsequent base limit values, and user activity conditions to achieve the subsequent base limit values. By providing such transparency, the dynamic base limit value allocation system can generate increasingly robust and flexible GUIs to provide practical applications from outputs and behaviors of computer-based base limit value model.

In addition to GUI flexibility, the dynamic base limit value allocation system can also generate GUIs to visualize model outputs and improve computing efficiency. In particular, by generating and displaying base limit values, subsequent base limit values, and user activity conditions to achieve subsequent base limit values, the dynamic base limit value modification system reduces the number of navigational steps required within a GUI in a limited screen space of a mobile device. Accordingly, the dynamic base limit value allocation system efficiently utilizes screen space and also utilizes less computational resources due to the reduction in navigation between different user interfaces (and/or information sources) to determine or interpret the outputs of a base limit value model.

Furthermore, the dynamic base limit value allocation system also flexibly and efficiently displays dynamic base limit values that change resulting from various digital transactions across multiple connected accounts (of a user). To illustrate, unlike conventional systems that are unable to determine and display effects of digital transactions in relation to multiple connected accounts, the dynamic base limit value allocation system can easily and efficiently determine an effect that a digital transaction from one part of multiple connected accounts has on a base limit value (and a transaction value limit). Furthermore, the dynamic base limit value allocation system can also display the changes in the base limit value (and the transaction value limit) within a single graphical user interface to effortlessly communicate an effect the base limit value has on multiple connected accounts of a user.

Moreover, in contrast to conventional systems that require navigation between multiple UIs to determine the effects on user account values due to transactions in multiple connected accounts, the dynamic base limit value allocation system can display modifications to base limit values and transaction limit values within a single graphical user interface. In one or more instances, by displaying modifications to the base limit values and transaction limit values in a single graphical user interface, the dynamic base limit value allocation system efficiently utilizes screen space and also utilizes less computational resources due to the reduction in navigation between different user interfaces (and/or information sources) to determine or interpret effects of digital transactions across multiple connected accounts.

Likewise, the dynamic base limit value allocation system also reduces the number of inquiries and/or electronic communications that are taken to identify information regarding a base limit value (or other output) of a base limit value model and/or base limit value modifiers from a user account. In particular, the dynamic base limit value allocation system can generate GUIs (or a single GUI) that determine and display the base limit value, the user activity conditions that contribute to the determined base limit value, subsequent base limit values, digital transactions, transaction value limit modifications, and/or digital actions related to the base limit value. Accordingly, additional electronic communications to obtain such information is reduced. As a result, the dynamic base limit value allocation system improves computational efficiency of implementing computing devices and networks by reducing the number of electronic communications and the accompanying network bandwidth.

Moreover, unlike conventional systems that are unable to accurately and quickly track digital transactions over multiple connected accounts and/or across user account values applicable to the connected accounts, the dynamic base limit value allocation system also can enable accurate and quick tracking that accounts for changes across multiple connected accounts and/or user account values. For instance, the dynamic base limit value allocation system automatically modifies a base limit value (and account specific limits) corresponding to a user account when digital transactions occur across multiple transaction accounts of a user account such that the base limit value accurately reflects real time (or near-real time) transactions. In addition, due to the accuracy of the automatically modified base limit value, the dynamic base limit value allocation system can accurately and quickly authorize digital transactions that depend on the base limit value and other account specific limits (e.g., a transaction value limit). Indeed, upon detecting a digital transaction, the dynamic base limit value allocation system can quickly (e.g., in real time and/or near-real time) and accurately check the digital transaction against the dynamically changing base limit value (that accounts for actions in multiple connected accounts) and a transaction value limit specific to an account in which the digital transaction occurs to authorize the digital transaction.

In addition, the dynamic base limit value allocation system can accurately determine account-specific values reflecting risk associated with user accounts. More specifically, the dynamic base limit value allocation system utilizes multiple activity machine learning models that are specifically trained for a category of user accounts. Indeed, by utilizing and emphasizing a varying set of user activity data variables for different types of user accounts, the dynamic base limit value allocation system improves the accuracy of determined metrics associated with a diverse range of user accounts.

As indicated by the foregoing discussion, the present disclosure utilizes a variety of terms to describe features and advantages of the dynamic base limit value allocation system. As used herein, the term "machine learning model" refers to a computer model that can be trained (e.g., tuned or learned) based on inputs to approximate unknown functions and corresponding outputs. As an example, a machine learning model can include, but is not limited to, a neural network (e.g., a convolutional neural network, recurrent neural network, or deep learning model), a decision tree (e.g., a gradient boosted decision tree, a random forest decision tree, a decision tree with variable or output probabilities), and/or a support vector machine.

Furthermore, as used herein, the term "activity machine learning model" refers to a machine learning model that can be trained to predict (or determine) an activity score for a user. In particular, an activity machine learning model can analyze input user account activity data corresponding to a user account to generate (or predict) an activity score for the user account. In some embodiments, the activity machine learning model includes a decision tree that generate probabilities for activity scores from various variables corresponding to various characteristics from user account activity data. Indeed, in one or more embodiments, the dynamic base limit value allocation system utilizes the probabilities corresponding to the various activity scores to select (or determine) an activity score for the user account. Additionally, in one or more embodiments, the dynamic base limit value allocation system can train multiple activity machine learning models to specifically generate activity scores for a category of user accounts (e.g., based on account activity duration).

As used herein, the term "activity score" refers to a value indicating a rating for a user account. In some embodiments, the activity score indicates a risk level corresponding to a user account. For example, the dynamic base limit value allocation system can utilize the activity score of a user account generated from an activity machine learning model to determine a base limit value utilization risk level for the user account. Indeed, the activity score of a user account can indicate the likelihood of a user account failing to pay a base limit value amount utilized by the user account. In some instances, the dynamic base limit value allocation system can utilize an activity score to determine a risk segment of a user account.

As used herein, the term "user activity data" refers to information (or data) associated with interactions of a user with the dynamic base limit value allocation system (or a corresponding client device application). For example, user activity data can include actions, durations corresponding to actions, frequencies of actions, digital transactions, account values, and/or other representations of interactions of a user corresponding to a user account on a client application (e.g., operating a client application as shown in FIG. 1). To illustrate, user activity data can include, but is not limited to, historical utilization of an application, a duration of satisfying a threshold account value (e.g., an amount of time that a user account satisfies a threshold account value within the user account), historical transaction activity within the user account, historical base limit value utilization, base limit value payoff times for the user account, historical flagged activities for the user account, historical digital transactions, historical deposit transactions, and/or a number of declined transactions corresponding to the user account.

Furthermore, as used herein, the term "user digital action" refers to an electronic activity or digital change within a user account or within one or more systems in relation to the user account in reaction to a digital user interaction of a user corresponding to the user account via a client application and/or a third party system. For example, a user digital action can include one or more digital network transactions in relation to the user account, a deposit and/or withdrawal transaction in relation to the user account, configuration of an automatic digital network transaction (e.g., direct deposit settings, auto payment settings) in relation to the user account. As another example, a user digital action can include user interactions to initiate or create accounts and/or account types (e.g., opening a savings account, opening a credit card account, opening a secured credit account), initiating and/or completing various user communications with one or more other user accounts (e.g., a network transaction with another user account, sending a user account referral link). In some cases, the dynamic base limit value allocation system detects various user digital actions from various user activity data (as described above).

As used herein, the term "digital transaction" refers to an electronic communication to facilitate (or request) utilization of a user account value (e.g., a fund). Indeed, a digital transaction can include an electronic communication to initiate a payment. Moreover, as used herein, the term "credit transaction" refers to a digital transaction within a credit account (e.g., a credit card account, a secured credit card account). Indeed, a credit transaction can include an electronic communication to initiate a payment utilizing a line of credit (or a user deposited secured line of credit as a transaction value limit) corresponding to the user account.

As used herein, the term "base limit value" refers to a numerical value that represents an excess utilization buffer for a user account. In particular, the base limit value can include a numerical value that represents an amount that a user account is permitted to obtain or transact in excess of an amount belonging to the user account. As an example, a base limit value can include a monetary overdraft amount or a line of credit. In addition, as used herein, the term "available base limit value" refers to a base limit value that is accessible for a user account (e.g., across multiple transaction and/or other accounts connected to the user account). In particular, the available base limit value can include the base limit value and/or a modified base limit value determined from the base limit value (and one or more digital transactions across multiple transaction and/or other accounts connected to the user account).

As used herein, the term "user activity condition" refers to a benchmark action from a user account that causes a change in a base limit value corresponding to the user account. In particular, the user activity condition can include a conditional action that upon performance from a user account results in a change (or assignment) of a base limit value for the user account. As an example, the user activity condition can include a deposit transaction activity (e.g., a user account transaction that adds a monetary value within the user account), a deposit transaction amount, a frequency of a deposit transaction, and/or a user-to-user transaction activity. In some embodiments, the user activity condition can include a user activity condition tier that indicates a range or level of user activity corresponding to the user account. For instance, the user activity condition tier can include a deposit transaction activity tier that indicates a range of deposit transaction amounts corresponding to a user account (e.g., $0 to $300, $301 to $700, $1801 to $2900 in deposit transaction amounts).

As used herein, the term "base limit value model" refers to a model that determines (and/or outputs) a base limit value for a user account from an activity score and/or user activity data. For example, a base limit value model can include a mapping of information between user activity scores, user activity conditions, and base limit values. In some embodiments, the base limit value model includes a machine learning model and/or a model (or representation) generated through a machine learning model that maps user activity scores, user activity conditions, and base limit values to output base limit values based on input activity scores and/or other user activity data.

In some instances, a base limit value model includes a base limit value matrix. For example, a base limit value matrix can include activity scores and user activity conditions that intersect to reference base limit values. In addition, a base limit value model can include a base limit value tiered data table. For instance, a base limit value tiered data table can include base limit values and a set of user activity conditions that achieve subsequent base limit values in the tiered data table.

Furthermore, as used herein, the term "secured credit account" (sometimes referred to as a "secured transaction account" or a "secured credit card") refers to a transaction user account that facilitates one or more digital transactions in relation to a transaction value limit. In particular, a secured credit account can include a user account that establishes a transaction value limit from one or more deposits (e.g., checks, direct deposits, wire transfers, automated clearing house (ACH) transactions). Indeed, in one or more instances, a secured credit account enables (or facilitates) a line of credit based on a transaction value limit to authorize (e.g., authorize and/or reject) one or more digital transactions and fulfill the one or more digital transactions utilizing a transaction value limit. In one or more cases, a secured credit account includes a credit card account with a secured line of credit (e.g., a transaction value limit) established through one or more user account deposit transactions.

As used herein, the term "transaction value limit" refers to a numerical value that represents an accessible amount for one or more digital transactions within a particular transaction account (e.g., a secured credit account). For example, a transaction value limit can include a numerical value (or amount) established through one or more deposit transactions corresponding to a user account. Indeed, a transaction value limit can include a limiter on an available amount to facilitate one or more digital transactions.

In some cases, a transaction value limit includes a secured line of credit value. For example, the dynamic base limit value allocation system can detect a deposited value from one or more deposit transactions and utilize the deposited value to establish a secured deposit account balance (as a transaction value limit) that sets a limit on utilization of a credit transaction account (e.g., a credit card). Moreover, the dynamic base limit value allocation system can receive one or more digital transactions (e.g., credit card transactions) and utilize the secured deposit account balance (e.g., the transaction value limit) to settle a credit card account balance. In some implementations, the dynamic base limit value allocation system can deny digital transactions that exceed the transaction value limit (and a base limit value).

Turning now to the figures, FIG. 1 illustrates a block diagram of a system 100 (or system environment) for implementing an inter-network facilitation system 104 and a dynamic base limit value allocation system 106 in accordance with one or more embodiments. As shown in FIG. 1, the system 100 includes server device(s) 102 (which includes an inter-network facilitation system 104 and the dynamic base limit value allocation system 106), client device 110, and a network 108. As further illustrated in FIG. 1, the server device(s) 102 and the client device 110 can communicate via the network 108.

Although FIG. 1 illustrates the dynamic base limit value allocation system 106 being implemented by a particular component and/or device within the system 100, the dynamic base limit value allocation system 106 can be implemented, in whole or in part, by other computing devices and/or components in the system 100 (e.g., the client device 110). Additional description regarding the illustrated computing devices (e.g., the server device(s) 102, the client device 110, and/or the network 108) is provided with respect to FIGS. 17 and 18 below.

As shown in FIG. 1, the server device(s) 102 can include the inter-network facilitation system 104. In some embodiments, the inter-network facilitation system 104 can determine, store, generate, and/or display financial information corresponding to a user account (e.g., a banking application, credit card application, a money transfer application). Furthermore, the inter-network facilitation system 104 can also electronically communicate (or facilitate) financial transactions between one or more user accounts (and/or computing devices). Moreover, the inter-network facilitation system 104 can also track and/or monitor financial transactions and/or financial transaction behaviors of a user within a user account.

Indeed, the inter-network facilitation system 104 can include a system that includes the dynamic base limit value allocation system and that facilitates financial transactions and digital communications across different computing systems over one or more networks. For example, an inter-network facilitation system manages credit accounts, secured accounts, and other accounts for a single account registered within the inter-network facilitation system. In some cases, the inter-network facilitation system is a centralized network system that facilitates access to online banking accounts, credit accounts, and other accounts within a central network location. Indeed, the inter-network facilitation system can link accounts from different network-based financial institutions to provide information regarding, and management tools for, the different accounts. For example, as shown in FIG. 1, each user account (e.g., user account 1 through user account N) of the inter-network facilitation system 104 can include varying, multiple transaction accounts (e.g., transaction accounts 1–N). For instance, the transaction accounts 1-N can include various accounts connected to a single user account, such as, but not limited to, credit accounts, secured accounts, and/or other accounts.

Furthermore, in accordance with one or more implementations described herein, the dynamic base limit value allocation system 106 can generate and display a base limit value and a transaction value limit for a user account (e.g., in relation to a secured credit account with one or more digital transactions). For example, the dynamic base limit value allocation system 106 can utilize a variety of machine learning models and a base limit value model to generate user interface elements that display a base limit value that changes based on digital transactions detected on multiple connected accounts corresponding to a user account (utilizing a transaction value limit). Additionally, the dynamic base limit value allocation system 106 can, upon detecting a digital transaction, utilize the base limit value to fulfill a remainder between a transaction value of the digital transaction and a transaction value limit corresponding to a secured credit account from the multiple connected accounts. Moreover, the dynamic base limit value allocation system 106 can display modifications to the base limit value (based on digital transactions across the multiple connected accounts) and a modified transaction value limit for the secured credit account. Additionally, the dynamic base limit value allocation system 106 can also authorize a digital transaction in comparison to the universally accessible base limit value and the transaction value limit.

As also illustrated in FIG. 1, the system 100 includes the client device 110. For example, the client device 110 may include, but is not limited to, a mobile device (e.g., smartphone, tablet) or other type of computing device, including those explained below with reference to FIG. 17. Additionally, the client device 110 can include a computing device associated with (and/or operated by) user accounts for the inter-network facilitation system 104. Moreover, although FIG. 1 illustrates a single client device (e.g., client device 110), the system 100 can include various numbers of client devices that communicate and/or interact with the inter-network facilitation system 104 and/or the dynamic base limit value allocation system 106.

Furthermore, as shown in FIG. 1, the client device 110 includes a client application 112. The client application 112 can include instructions that (upon execution) cause the client device 110 to perform various actions. For example, as shown in FIG. 1, a user of a user account can interact with the client application 112 on the client device 110 to access financial information, initiate a financial transaction, and/or select, utilize, and/or view a base limit value and/or transaction value limit displayed within the client application 112. In addition, the client application 112 can display one or more digital transactions related to the transaction value limit and/or base limit value in accordance with one or more implementations herein.

In certain instances, the client device 110 corresponds to one or more user accounts (e.g., user accounts stored at the server device(s) 102). For instance, a user of a client device can establish a user account with login credentials and various information corresponding to the user. In addition, the user accounts can include a variety of information regarding financial information and/or financial transaction information for users (e.g., name, telephone number, address, bank account number, credit amount, debt amount, financial asset amount), payment information, transaction history information, and/or contacts for financial transactions. In some embodiments, a user account can be accessed via multiple devices (e.g., multiple client devices) when authorized and authenticated to access the user account within the multiple devices.

The present disclosure utilizes client devices to refer to devices associated with such user accounts. In referring to a client (or user) device, the disclosure and the claims are not limited to communications with a specific device, but any device corresponding to a user account of a particular user. Accordingly, in using the term client device, this disclosure can refer to any computing device corresponding to a user account of an inter-network facilitation system.

As further shown in FIG. 1, the system 100 includes the network 108. As mentioned above, the network 108 can enable communication between components of the system 100. In one or more embodiments, the network 108 may include a suitable network and may communicate using a various number of communication platforms and technologies suitable for transmitting data and/or communication signals, examples of which are described with reference to FIG. 17. Furthermore, although FIG. 1 illustrates the server device(s) 102 and the client device 110 communicating via the network 108, the various components of the system 100 can communicate and/or interact via other methods (e.g., the server device(s) 102 and the client device 110 can communicate directly).

Figure 2A:
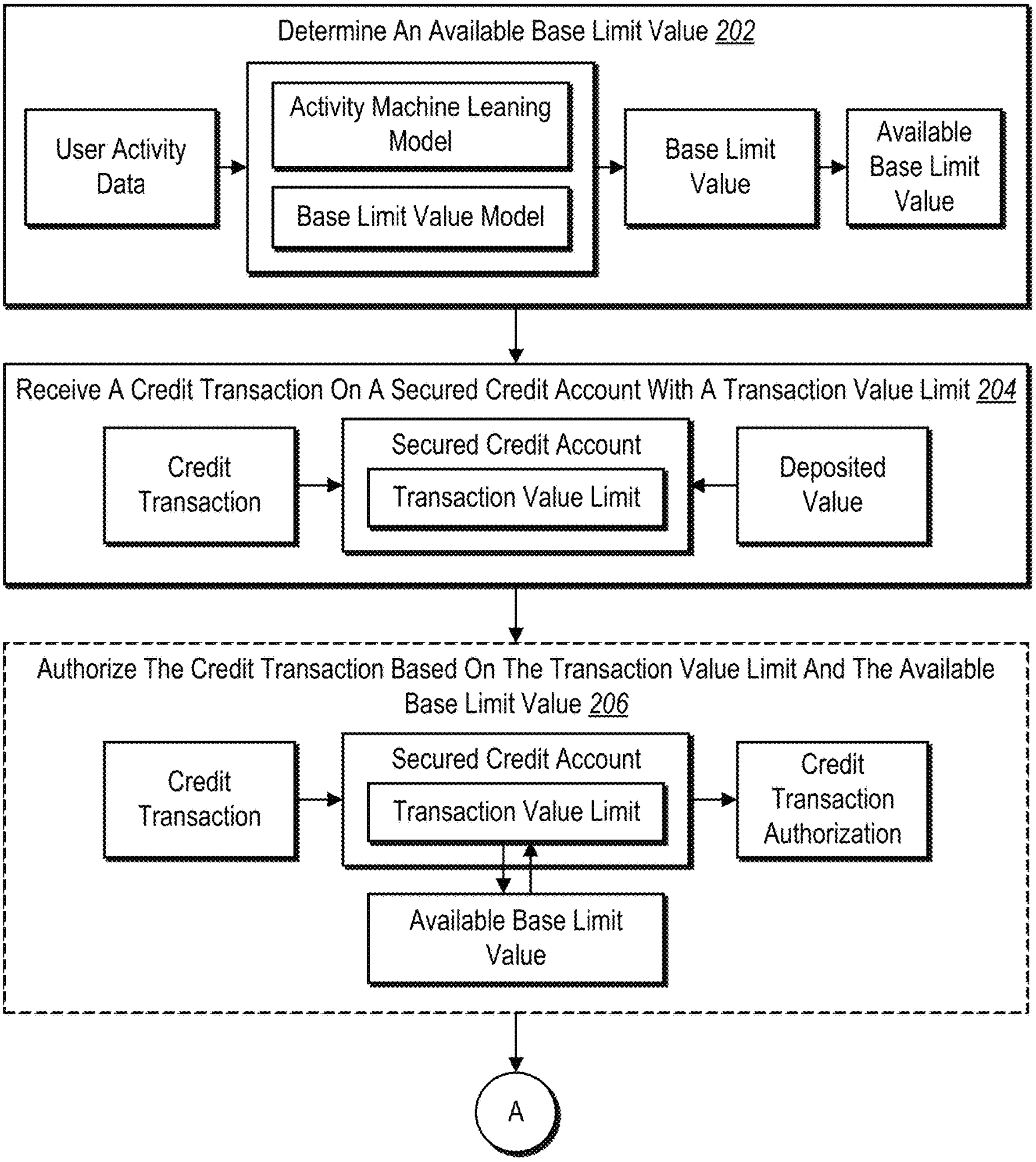
FIGS. 2A and 2B illustrate an overview of a dynamic base limit value allocation system determining and displaying a base limit value in relation to one or more digital transactions and a transaction value limit in accordance with one or more implementations.
Figure 2B:
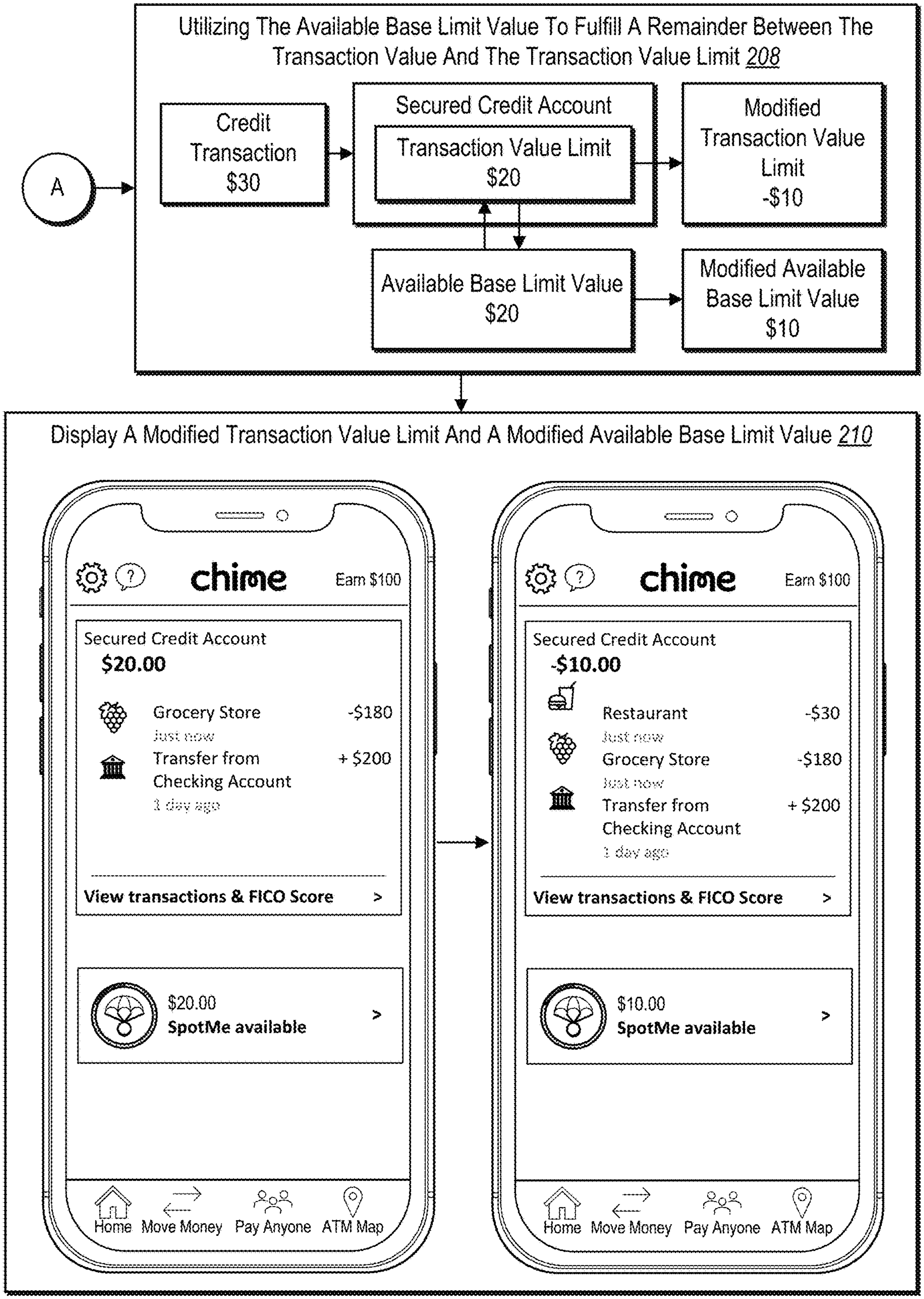

As mentioned above, the dynamic base limit value allocation system 106 determines and displays a base limit value in relation to digital transactions detected on multiple connected accounts corresponding to a user account (utilizing a transaction value limit). For instance, FIGS. 2A and 2B illustrate an overview of the dynamic base limit value allocation system 106 determines and displays a base limit value in relation to one or more digital transactions and a transaction value limit. In particular, FIGS. 2A and 2B illustrate an overview of the dynamic base limit value allocation system 106 determining an available base limit value, receiving a credit transaction on a secured credit account with a transaction value limit, utilizing the available base limit value to fulfill a remainder between the transaction value and the transaction value limit, and displaying a modified transaction value limit and a modified available base limit value. In addition, FIG. 2A also illustrates an overview of the dynamic base limit value allocation system 106 authorizing the credit transaction based on the transaction value limit and the available base limit value.

As shown in act 202 of FIG. 2A, the dynamic base limit value allocation system 106 determines an available base limit value. For example, as shown in the act 202 of FIG. 2A, the dynamic base limit value allocation system 106 utilizes an activity machine learning model and a base limit value model to determine a base limit value for a user account from user activity data. In some cases, the dynamic base limit value allocation system 106 also utilizes the base limit value (with one or more digital transactions and/or account balances of one or more connected accounts) to determine the available base limit value. Indeed, the dynamic base limit value allocation system 106 generating an activity score from an activity machine learning model and/or utilizing a base limit value model to determine (available) base limit values (and/or subsequent base limit values) is described in greater detail below (e.g., in relation to FIGS. 3-7).

Furthermore, as shown in act 204 of FIG. 2A, the dynamic base limit value allocation system 106 receives a credit transaction on a secured credit account with a transaction value limit. Indeed, as shown in the act 204, the dynamic base limit value allocation system 106 can receive a credit transaction within a secured credit account (e.g., a credit card transaction) with a transaction value. Moreover, as shown in the act 204, the dynamic base limit value allocation system 106 can generate a transaction value limit based on a deposited value to the secured credit account. Indeed, receiving credit transactions and/or determining a transaction value limit is described in greater detail below (e.g., in relation to FIGS. 8 and 10).

As also shown in act 206 of FIG. 2A, in some cases, the dynamic base limit value allocation system 106 can authorize the credit transaction based on the transaction value limit and the available base limit value. For instance, the dynamic base limit value allocation system 106 can compare the transaction value associated with the credit transaction to the transaction value limit (of the secured credit account) and an available base limit value to determine a credit transaction authorization. Indeed, authorizing the credit transaction based on the transaction value limit and the available base limit value is described in greater detail below (e.g., in relation to FIG. 11).

Moreover, as shown in act 208 of FIG. 2B, the dynamic base limit value allocation system 106 utilize the available base limit value to fulfill a remainder between the transaction value and the transaction value limit. Indeed, the act 208 of FIG. 2B illustrates an exemplary scenario of the dynamic base limit value allocation system 106 utilizing an available base limit value. As shown in the act 208, the dynamic base limit value allocation system 106 determines that a credit transaction (e.g., $30) exceeds a transaction value limit (e.g., $20) within the secured credit account. In response, as shown in the act 208, the dynamic base limit value allocation system 106 utilizes an available base limit value (e.g., $20) to fulfill the remainder (e.g., $10) between the transaction value (e.g., $30) and the transaction value limit (e.g., $20). As further shown in the act 208, the dynamic base limit value allocation system 106 also determines a modified transaction value limit (e.g., –$10) and a modified available base limit value (e.g., $10) due to the credit transaction. Indeed, the dynamic base limit value allocation system 106 utilizing an available base limit value to fulfill a remainder between a transaction value and a transaction value limit is described in greater detail below (e.g., in relation to FIGS. 9, 10, and 12-15).

Additionally, as shown in act 210 of FIG. 2B, the dynamic base limit value allocation system 106 displays a modified transaction value limit and a modified available base limit value. For instance, as shown in the act 210, the dynamic base limit value allocation system 106 updates a graphical user interface to display modifications to a transaction value limit (e.g., a Secured Credit Account value changing from $20 to –$10) in response to a digital transaction (e.g., Restaurant, –$30), as described in the act 208. In addition, as shown in the act 210, the dynamic base limit value allocation system 106 also updates the graphical user interface to display modifications to an available base limit value (e.g., a SpotMe available value changing from $20 to $10) in response to the digital transaction (e.g., Restaurant, –$30), as described in the act 208. Indeed, the dynamic base limit value allocation system 106 displaying modifications to transaction value limits and available base limit values based on digital transactions across one or more connected transaction accounts is described in greater detail below (e.g., in relation to FIGS. 9, 10, and 12-15).

Figure 3:
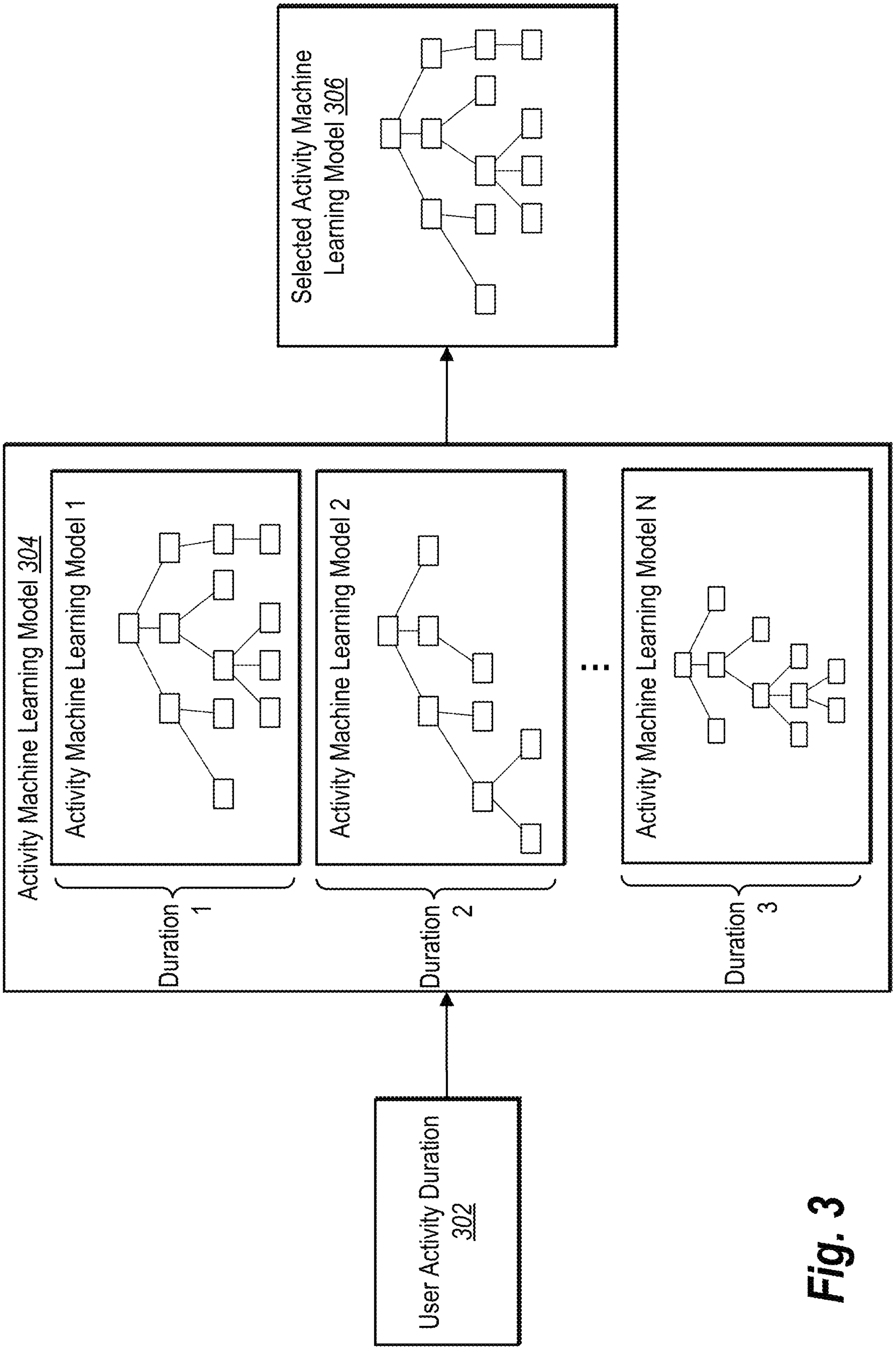
FIG. 3 illustrates a dynamic base limit value allocation system selecting an activity machine learning model in accordance with one or more implementations.

As previously mentioned, the dynamic base limit value allocation system 106 can select an activity machine learning model for a user account based on characteristics of the user account. For example, FIG. 3 illustrates the dynamic base limit value allocation system 106 selecting between activity machine learning models. In particular, FIG. 3 illustrates the dynamic base limit value allocation system 106 utilizing a user activity duration to select an activity machine learning model from between multiple activity machine learning models.

As shown in FIG. 3, the dynamic base limit value allocation system 106 identifies a user activity duration 302 for a user account. In some instances, the user activity duration can include a time or duration that the user account has been active (e.g., from a creation of the user account, from an active status of a user account). In one or more embodiments, the dynamic base limit value allocation system 106 utilizes the user activity duration to indicate an age (or tenure) of a user account. As an example, a user activity duration can include a user account age such as, but not limited to, 3 weeks from account creation, 2 months from account creation, and/or 2 years from account creation.

As further shown in FIG. 3, the dynamic base limit value allocation system 106 identifies multiple activity machine learning models 304. Furthermore, FIG. 3 illustrates the multiple activity machine learning models corresponding to various user activity durations ranges (e.g., a range of time). In one or more embodiments, the dynamic base limit value allocation system 106 compares the user activity duration 302 to the user activity duration ranges corresponding to the multiple activity machine learning models 304 to select an activity machine learning model 306.

For example, the dynamic base limit value allocation system 106 can determine that the user activity duration 302 satisfies a particular user activity duration range corresponding to an activity machine learning model from the multiple activity machine learning models 304. Subsequently, the dynamic base limit value allocation system 106 can select the activity machine learning model that corresponds to the particular user activity duration range as the activity machine learning model for the user account.

Although one or more embodiments describe the dynamic base limit value allocation system 106 utilizing a user activity duration to select the activity machine learning model, the dynamic base limit value allocation system 106 can utilize various types of user account data (or characteristics) to select an activity machine learning model. For example, the dynamic base limit value allocation system 106 can utilize an activity (or usage) time corresponding to a user account (e.g., the amount of time that a user account is actively online within a client application of the inter-network facilitation system), an account value, an amount of time with a threshold amount of direct deposit value, a number of financial account types, types of financial accounts, and/or other user account characteristics (user age, user authentication security settings, geographic location). Furthermore, although one or more embodiments associates activity machine learning models with user activity duration ranges, the dynamic base limit value allocation system 106 can associate the activity machine learning models to various types of user account data (or characteristics) with various types of categorical references (e.g., a list or mapping of types, a specific value, a threshold).

Indeed, in one or more embodiments, the dynamic base limit value allocation system 106 trains each activity machine learning model from the multiple activity machine learning models for a specific set of user accounts (e.g., based on the categorization with the user account data or characteristics such as user activity duration). As an example, the dynamic base limit value allocation system 106 trains an activity machine learning model to generate an accuracy score for a user account that corresponds to a user activity duration associated with the activity machine learning model. By training the activity machine learning model for user accounts within a user activity duration range, the dynamic base limit value allocation system 106 generates and selects activity machine learning models that are accurate for a specific grouping of user accounts and the resulting activity scores are more accurate indicators of risk for the specific grouping of user accounts.

As an example, the dynamic base limit value allocation system 106 can train a first activity machine learning model to generate activity scores for user accounts utilizing a first set of user activity data. Moreover, the dynamic base limit value allocation system 106 can train a second activity machine learning model to generate activity scores for user accounts utilizing a second set of user activity data. Indeed, the first set of user activity data can include a combination of user activity data variables that are different from the second set of user activity data. By doing so, the dynamic base limit value allocation system 106 can train activity machine learning models to emphasize user activity data that more effectively determines a risk (or other metric) of user accounts belonging to a group of user accounts in a particular grouping (e.g., based on user activity duration).

In one or more embodiments, the dynamic base limit value allocation system 106 trains an activity machine learning model utilizing historical user activity data from user accounts. In particular, the dynamic base limit value allocation system 106 utilizes historical user activity data from a user account to select an activity machine learning model and generate a predicted activity score for the user account. Then, the dynamic base limit value allocation system 106 can determine a loss function by comparing the predicted activity score to historical behaviors of the user account (as ground truth data). For example, the dynamic base limit value allocation system 106 can identify the number of times that the user account has paid back a utilized base limit value and/or the number of unpaid utilized base limit values as ground truth data. Then, the dynamic base limit value allocation system 106 can compare the ground truth data to the generated activity score to calculate a loss that indicates the accuracy of the activity score for the particular user. For example, the dynamic base limit value allocation system 106 can utilize a loss function such as, but not limited to, an L1 loss, L2 loss, mean square error, classification loss, and/or cross entropy loss.

In some embodiments, the dynamic base limit value allocation system 106 utilizes third party metric information of user accounts to generate a loss (or determine an accuracy) for a generated activity score from an activity machine learning model. For example, the dynamic base limit value allocation system 106 can receive (or identify) a fraud (or risk) score for a user account from a third party source as the metric information of the user account. Indeed, a fraud (or risk) score can indicate whether a user account is associated with fraudulent activity and/or negative credit reports. Then, the dynamic base limit value allocation system 106 can compare the fraud (or risk) score to the activity score generated by the activity machine learning model to determine an accuracy of the activity machine learning model (e.g., a loss function).

Furthermore, the dynamic base limit value allocation system 106 can utilize a loss value determined from a predicted (or generated) activity score of a user account to train an activity machine learning model. In particular, in one or more embodiments, the dynamic base limit value allocation system 106 trains an activity machine learning model based on a loss value by adjusting or learning parameters of the activity machine learning model (e.g., back propagation), adjusting weights provided to various user activity data variables, and/or modifying the user activity data variables utilized for the activity machine learning model. In some embodiments, the dynamic base limit value allocation system 106 adjusts (or modifies) the risk values (or scores) associated with various nodes in an activity score decision tree model based on the loss values.

Figure 4:
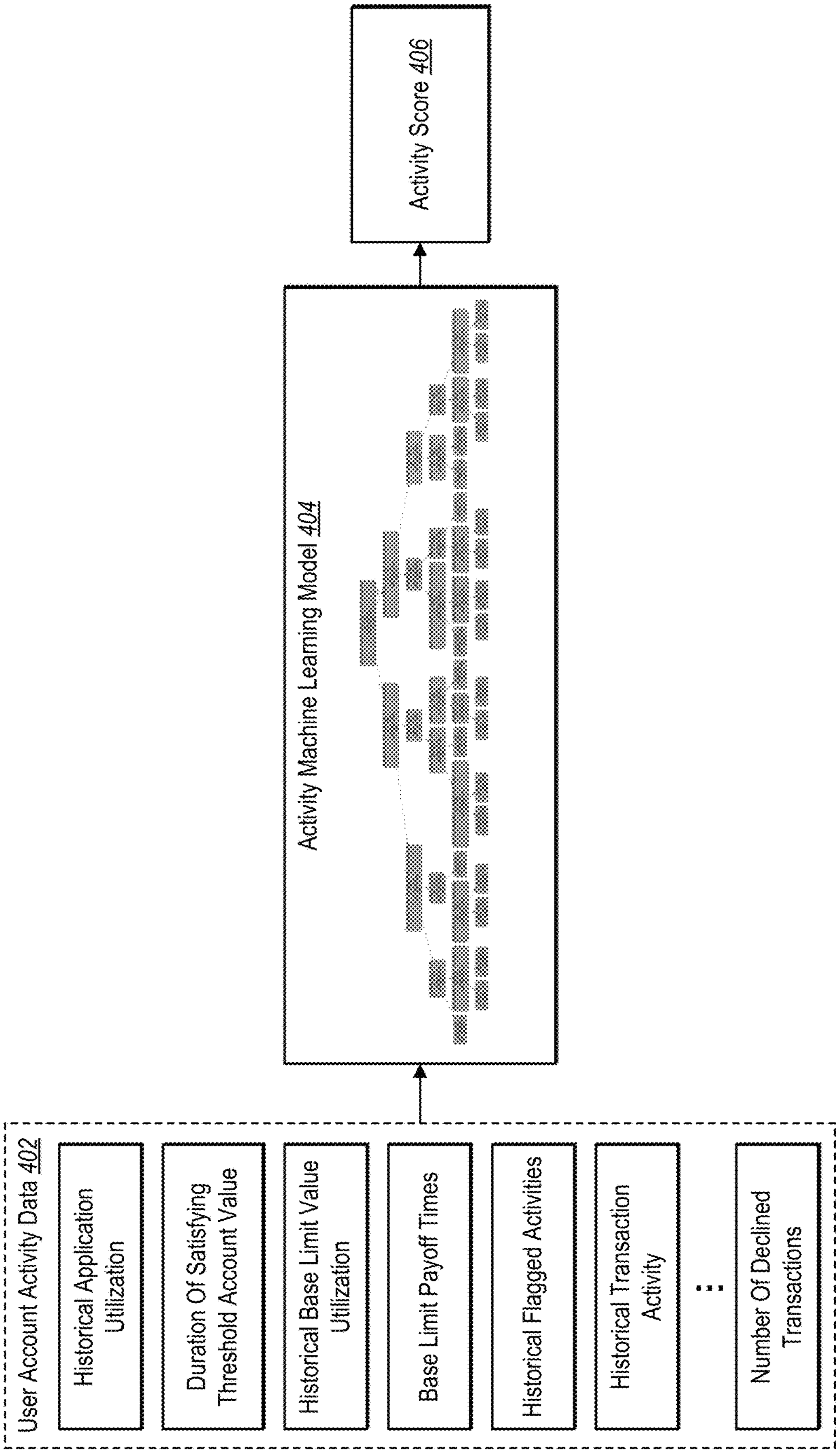
FIG. 4 illustrates a dynamic base limit value allocation system generating an activity score utilizing an activity machine learning model in accordance with one or more implementations.

As mentioned above, the dynamic base limit value allocation system 106 can generate an activity score for a user account utilizing an activity machine learning model. For example, FIG. 4 illustrates the dynamic base limit value allocation system 106 generating an activity score utilizing an activity machine learning model with user account activity data of a user account. As shown in FIG. 4, the dynamic base limit value allocation system 106 utilizes user account activity data 402 with a selected activity machine learning model 404 to generate an activity score. In particular, as shown in FIG. 4, the dynamic base limit value allocation system 106 utilizes the variables from the user account activity data 402 with a decision tree model of the activity machine learning model 404 to determine an activity score (e.g., the activity score 406) that accurately corresponds to the combination of variable information for the user account activity data 402.

As illustrated in FIG. 4, the dynamic base limit value allocation system 106 can utilize various types of variables for the user account activity data 402. For instance, as shown in FIG. 4, the user account activity data 402 can include historical application utilization, a duration of satisfying a threshold account value, historical base limit value utilization, base limit payoff times, historical flagged activities, historical transaction activities, and/or a number of declined transactions. As an example, the dynamic base limit value allocation system 106 can utilize historical application utilization data that indicate historical actions of a user account. For example, the historical application utilization data can include, but is not limited to, a number of application logins, application features utilized by a user of a user account, and/or a frequency corresponding to the utilized features.

In addition, the dynamic base limit value allocation system 106 can utilize a duration of satisfying a threshold account value from a user account. In particular, the duration of satisfying a threshold account value can include an amount of time (e.g., days, months, and/or years) that a user account has maintained an account value (e.g., an account balance) that is equal to or above a particular threshold account value. In addition, the dynamic base limit value allocation system 106 can utilize a historical base limit value utilization. In one or more embodiments, the dynamic base limit value allocation system 106 can utilize the historical base limit value utilization to indicate the amount, frequency, and times (e.g., dates, times of day) that a user account has utilized a provided base limit value. Additionally, the dynamic base limit value allocation system 106 can utilize base limit payoff times from a user account that indicates times (e.g., dates, times of day) of transactions that pay a utilized base limit value amount within a user account.

Furthermore, the dynamic base limit value allocation system 106 can utilize historical flagged activities as user account activity data for an activity machine learning model. As an example, a historical flagged activity can include flags (or notes) corresponding to a user account that indicates various identified activities of the user account such as, but not limited to, a flag indicating fraudulent activity, a flag indicating historical bans and/or blacklists of a user account, and/or previous penalties associated with a user account. In addition, the historical flagged activities can include third party reports on a user account that identifies (or indicates) fraudulent, malicious, and/or other security related activities or actions taken by a user of the user account.

Additionally, the dynamic base limit value allocation system 106 can also utilize historical transaction activities as user account activity data. In some embodiments, the dynamic base limit value allocation system 106 identifies previous transactions with merchants, services, persons, and/or other users of the inter-network facilitation system as historical transaction activities. In certain instances, the dynamic base limit value allocation system 106 utilizes a transaction type (e.g., utilities, shopping, travel, fitness) associated with the transaction as part of the historical transaction activity. In some cases, the dynamic base limit value allocation system 106 utilizes various combinations of at least the timing corresponding to the historical transaction activity (e.g., dates, time of days, time), the recipient or sender of the transactions, and/or transaction amounts as part of historical transaction activities. In addition, the dynamic base limit value allocation system 106 can also utilize a number of declined transactions as user account activity data. For example, the dynamic base limit value allocation system 106 a number of declined transactions to indicate a number of times a user account has had a declined transaction (e.g., due to insufficient funds, fraud alerts).

Although one or more embodiments describe the dynamic base limit value allocation system 106 utilizing particular types of user account activity data, the dynamic base limit value allocation system 106 can utilize various user account activity data variables within an activity machine learning model to generate an activity score. In particular, the dynamic base limit value allocation system 106 can utilize numerous variables (e.g., hundreds, thousands) corresponding to various categories such as, but not limited to, activity logs of a user account sessions, user account balances, user account transactions, user account income and/or occupation information, geographic location information, financial products (e.g., credit cards, loans) associated with the user account, contact information associated with a user account (e.g., phone numbers, email addresses), user account spending, and/or transaction behaviors.

As mentioned above, the dynamic base limit value allocation system 106 can train multiple activity machine learning models to accurately generate activity scores for a specific category of user accounts. Indeed, the dynamic base limit value allocation system 106 can train an activity machine learning model to emphasize (or function) for a specific set of user account activity data variables. In particular, the dynamic base limit value allocation system 106 can determine a set of user account activity data variables to utilize for a particular activity machine learning model (e.g., based on a duration of activity from a user account or other characteristic of a user account). In some cases, the dynamic base limit value allocation system 106 can provide (or assign) weights to particular user account activity data variables based on the duration of activity from a user account or other characteristic of a user account (e.g., for the selected activity machine learning model).

As shown in FIG. 4, the dynamic base limit value allocation system 106 utilizes an activity score decision tree as the activity machine learning model. In one or more embodiments, the dynamic base limit value allocation system 106 utilizes an activity machine learning model comprising an activity score decision tree that includes various user account activity data variables that branch based on the user account activity data satisfying (or not satisfying) the thresholds generated for the various user account activity data variables. Then, based on satisfying (or not satisfying) the thresholds corresponding to the user account activity data variables, the dynamic base limit value allocation system 106 can determine the effect the branching user account activity data variables contributes to a risk score (or value) of a user account (e.g., in terms of a risk percentage).

To illustrate, the dynamic base limit value allocation system 106 can utilize an activity score decision tree to determine whether data of a user account (e.g., activity data) satisfies a threshold for a first node of the decision tree. Based on whether the user account satisfies the threshold for the first node, the dynamic base limit value allocation system 106 can track a risk score for the user account and further traverse to subsequent nodes to check other user activity data variables. Indeed, at each node of the decision tree, the dynamic base limit value allocation system 106 can adjust the risk score of the user account based on whether the user account activity data satisfies the thresholds for the user activity data variable at the particular node.

As an example, at a first node of the decision tree, the dynamic base limit value allocation system 106 can identify whether an account balance of a user account has been above a threshold balance amount for a threshold number of days. In some instances, upon determining that the account balance of the user account does satisfy the threshold balance amount and the threshold number of days, the dynamic base limit value allocation system 106 can subsequently traverse to a node of the activity score decision tree that does not increase the risk score of the user account. On the other hand, upon determining that the account balance of the user account does not satisfy the threshold balance for the threshold number of days, the dynamic base limit value allocation system 106 can subsequently traverse to a node of the activity score decision tree that increases the risk score of the user account. In addition, the dynamic base limit value allocation system 106 can further analyze another user activity data variable at the subsequent nodes to further determine increases (and/or decreases) in a risk score for the user account.

In one or more embodiments, the dynamic base limit value allocation system 106 outputs an activity score that indicates a numerical value within a predetermined range based on the risk score (or another value) of the decision tree of the activity machine learning model. For instance, the dynamic base limit value allocation system 106 can utilize an activity score value between zero and six. In particular, the dynamic base limit value allocation system 106 can utilize the activity score value of zero to six to indicate varying risk levels corresponding to the user account (e.g., via a risk score from the activity score decision tree). For instance, an activity score of zero can be associated with a high risk level (e.g., a high risk percentage) and an activity score of six can be associated with a low risk level (or vice versa). Indeed, the activity score can indicate a risk level of a user account failing to repay a utilized base limit value (or failing to reinstate an account balance amount that satisfies the base limit value).

In some embodiments, the activity score can be various numerical values (e.g., zero to nine) and/or other types of data to indicate a category (or magnitude) of risk of a user account. For example, the activity score can include an alphabetical grade, a percentage, class, and/or a label. In addition, although one or more embodiments describe the dynamic base limit value allocation system 106 generating an activity score from a risk value determined within a decision tree of the activity machine learning model, the dynamic base limit value allocation system 106 can utilize the decision tree of the activity machine learning model to generate various metrics. For instance, the dynamic base limit value allocation system 106 can utilize the activity machine learning model to generate metrics such as, but not limited to, an interest (or satisfaction) value of a user account, a conversion probability for the user account, a loyalty of the user account, a user activity condition tier for the user account, and/or a risk segment for the user account.

For instance, although one or more embodiments describe the dynamic base limit value allocation system 106 utilizing machine learning models to generate (or predict) an activity score for a user account, the dynamic base limit value allocation system 106 can also utilize machine learning models to determine user activity condition tiers (e.g., a deposit transaction activity tier) for the user account as a metric. To illustrate, the dynamic base limit value allocation system 106 can utilize user account activity data with an activity machine learning model to determine a user activity condition tier for a user account. In some cases, the user activity condition tier includes a deposit transaction activity tier for a user account that associates the user account with a range of deposit transaction activity amounts (e.g., $0 to $300, $301 to $700, $701 to $1200). In one or more embodiments, the dynamic base limit value allocation system 106 utilizes a determined user activity condition tier for a user account to determine an activity score (e.g., determining a higher activity score as a user accounts user activity condition tier rises).

Furthermore, although one or more embodiments describe the dynamic base limit value allocation system 106 utilizing machine learning models to generate (or predict) an activity score for a user account, in some implementations, the dynamic base limit value allocation system 106 can also utilize machine learning models to determine risk segments for the user account as a metric. In particular, the dynamic base limit value allocation system 106 can utilize user account activity data with an activity machine learning model to determine a risk segment for a user account. Indeed, in some instances, the risk segment indicates a categorized likelihood of a user account failing to pay a base limit value amount utilized by the user account (i.e., risk level). For instance, the dynamic base limit value allocation system 106 can utilize the user account activity data with an activity machine learning model to determine risk segments, such as, but not limited to, low risk, medium risk, and/or high risk for a user account. In some implementations, the dynamic base limit value allocation system 106 utilizes a determined activity score (from the activity machine learning model) for a user account to determine a risk segment for the user account (e.g., determining a lower risk segment as the activity score for the user account increases).

In addition, although one or more embodiments describe the dynamic base limit value allocation system 106 utilizing an activity score decision tree model, the dynamic base limit value allocation system 106 can utilize various machine learning models to generate (or predict) an activity score for a user account. For example, the dynamic base limit value allocation system 106 can utilize a classification neural network to classify a user account into an activity score (or activity score grouping) based on one or more user activity data variables. In some instances, the dynamic base limit value allocation system 106 can utilize a regression-based and/or clustering-based machine learning models to determine an activity score for a user account based on one or more user activity data variables.

Moreover, in one or more embodiments, the dynamic base limit value allocation system 106 can determine activity scores using activity machine learning models as described in U.S. application Ser. No. 17/519,129 filed Nov. 4, 2021, entitled GENERATING USER INTERFACES COMPRISING DYNAMIC BASE LIMIT VALUE USER INTERFACE ELEMENTS DETERMINED FROM A BASE LIMIT VALUE MODEL (hereinafter "application Ser. No. 17/519,129"), the contents of which are herein incorporated by reference in their entirety.

Figure 5:
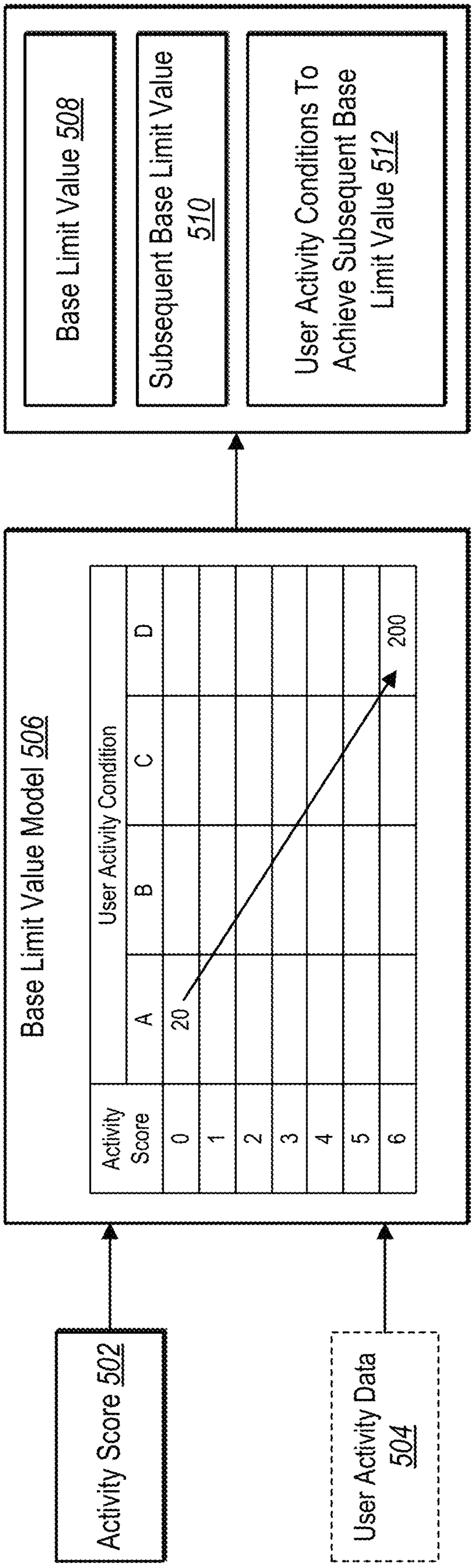
FIG. 5 illustrates a dynamic base limit value allocation system determining a base limit value utilizing a base limit value matrix in accordance with one or more implementations.

As previously mentioned, the dynamic base limit value allocation system 106 can determine a base limit value from an activity score utilizing a base limit value model. For example, FIG. 5 illustrates the dynamic base limit value allocation system 106 utilizing a base limit value matrix as the base limit value model to determine a base limit value for a user account. Indeed, FIG. 5 illustrates the dynamic base limit value allocation system 106 utilizing an activity score generated for a user account with a base limit value matrix to determine a base limit value.

As shown in FIG. 5, the dynamic base limit value allocation system 106 utilizes an activity score 502 (and user activity data 504) to determine a base limit value from a base limit value model 506 (e.g., a base limit value matrix). As shown in FIG. 5, the dynamic base limit value allocation system 106 can reference the base limit value model 506 to identify a base limit value that maps to the activity score 502. As an example, for an activity score of zero (e.g., a high risk user account), the dynamic base limit value allocation system 106 can determine a base limit value from a section of the base limit value model 506 that corresponds to the activity score of zero within the matrix.

In addition, as shown in FIG. 5, the dynamic base limit value allocation system 106 can also utilize the user activity data 504. In particular, the dynamic base limit value allocation system 106 can reference the base limit value model 506 to identify a base limit value that maps to the activity score 502 and a user activity condition. For instance, the user activity condition can include a conditional action that triggers a mapping to a base limit value under the section of the base limit value model 506 for the user activity condition. To illustrate, upon determining that the activity score 502 is six and the user activity data 504 triggers (or maps) to the user activity condition "d," the dynamic base limit value allocation system 106 can determine a base limit value of 200. As shown in FIG. 5, the dynamic base limit value allocation system 106 can determine a base limit value 508, a subsequent base limit value 510, and user activity conditions to achieve the subsequent base limit value 512 from the base limit value model 506.

In some embodiments, the dynamic base limit value allocation system 106 can utilize an account deposit amount as the user activity condition within the base limit value model 506. For example, the user activity condition can include a deposit transaction activity of a particular deposit amount. Moreover, in one or more embodiments, the dynamic base limit value allocation system 106 can determine from the user activity data 504 a deposit transaction activity of the user account (e.g., a deposit transaction activity of 2000 dollars). Then, upon determining that the activity score 502 is six and the user activity data 504 triggers (or maps) to the user activity condition “d” when the condition is a deposit transaction of 2000 dollars, the dynamic base limit value allocation system 106 can determine a base limit value of 200 for the user account.

Although one or more embodiments describes a deposit transaction activity as the user activity condition, the dynamic base limit value allocation system 106 can utilize various user activity data for the user activity condition. For instance, the user activity condition within a base limit value matrix can include a frequency of a deposit transaction, a user-to-user transaction activity, and/or a spending transaction activity. Indeed, the dynamic base limit value allocation system 106 can map user activity data and activity score from a user account to a base limit value matrix to determine a base limit value for the user account.

Although one or more embodiments herein illustrate the dynamic base limit value allocation system 106 utilizing user activity conditions and activity scores as variables within a base limit value model (e.g., base limit value matrix) to determine a base limit value for a user account, in one or more embodiments, the dynamic base limit value allocation system 106 can utilize various dimensions of variables in the base limit value model (e.g., base limit value matrix). For instance, in some cases, the dynamic base limit value allocation system 106 can utilize a base limit value matrix that represents relationships (or mappings) between user activity condition tiers, activity scores, and particular risk segments of a user account. Indeed, the dynamic base limit value allocation system 106 can input activity condition tiers, activity scores, and particular risk segments corresponding to a user account within the base limit value model (e.g., base limit value matrix) to select (or output) a base limit value for the user account.

In addition, the dynamic base limit value allocation system 106 can also determine a subsequent base limit value for a user account from a base limit value matrix. For example, the dynamic base limit value allocation system 106 can determine the next incremental step (or change) in base limit values in relation to a determined base limit value from a base limit value matrix as the subsequent base limit value. For instance, the dynamic base limit value allocation system 106 can determine that when a base limit value is 20 and, within the same activity score, the next achievable base limit value that is an element in the base limit value matrix is 30, the dynamic base limit value allocation system 106 can determine that the subsequent base limit value is 30.

Moreover, the dynamic base limit value allocation system 106 can also determine one or more user activity conditions within the base limit value matrix to achieve the subsequent base limit value. For instance, the dynamic base limit value allocation system 106 can identify from the base limit value matrix, the user activity condition that changes the determined base limit value to the subsequent base limit value. As an example, in reference to FIG. 5, the dynamic base limit value allocation system 106 can determine that in order to move from a base limit value of 20 to the subsequent base limit value (e.g., 30), the user account needs to satisfy the user activity condition “b” from the user activity condition “a.” Accordingly, the dynamic base limit value allocation system 106 can determine and provide that the user activity condition “b” achieves the subsequent base limit value for the user account.

Figure 6:
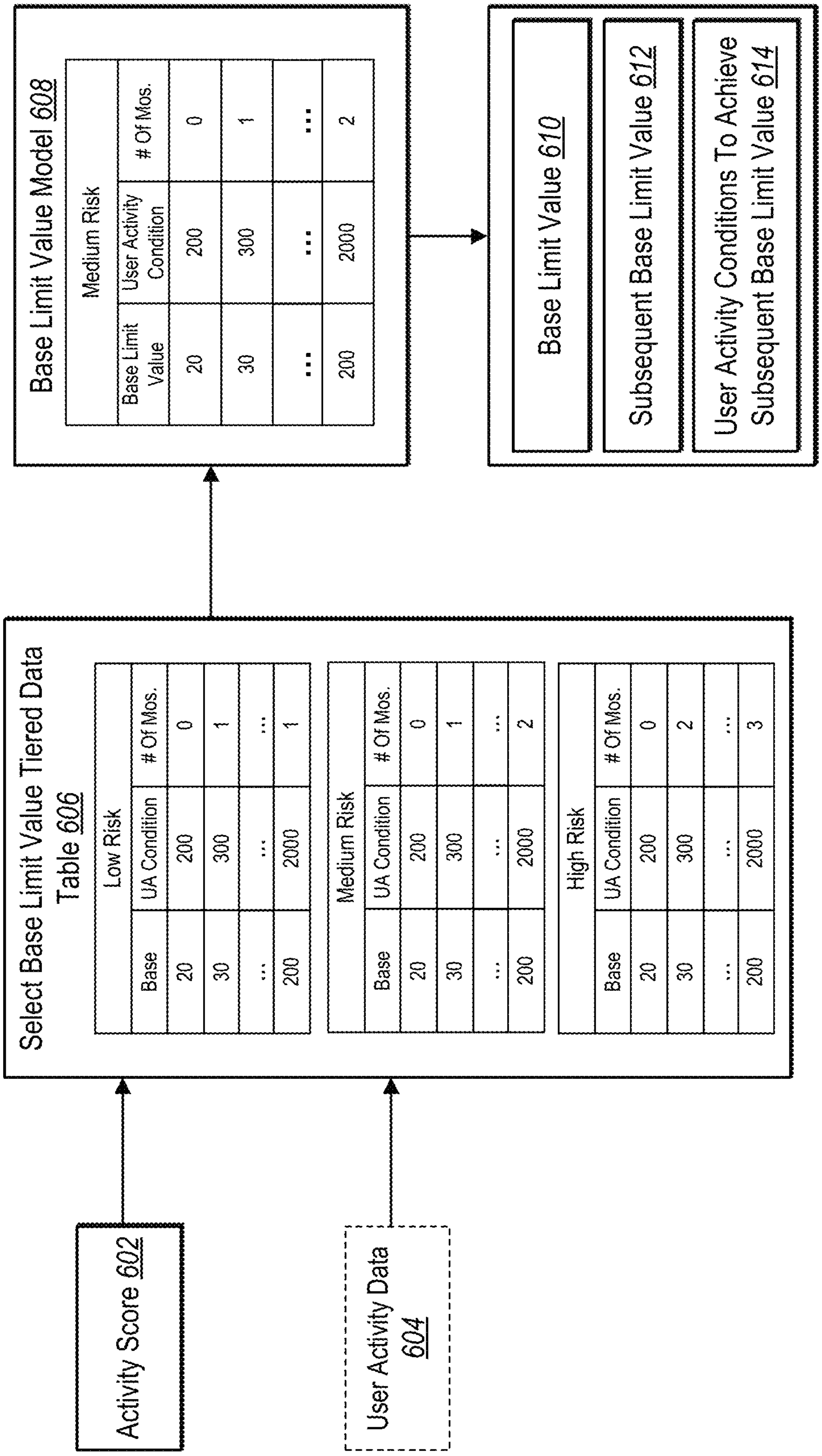
FIG. 6 illustrates a dynamic base limit value allocation system determining a base limit value utilizing a base limit value tiered data table in accordance with one or more implementations.

As mentioned above, in one or more embodiments, the dynamic base limit value allocation system 106 utilizes a base limit value tiered data table as a base limit value model to determine a base limit value for a user account. For instance, FIG. 6 illustrates the dynamic base limit value allocation system 106 utilizing a base limit value tiered data table to determine a base limit value for a user account. As shown in FIG. 6, the dynamic base limit value allocation system 106 can select a base limit value tiered data table from multiple base limit value tiered data tables and then utilize the selected base limit value tiered data table to identify a base limit value, a subsequent base limit value, and one or more user activity conditions to achieve the subsequent base limit value.

For instance, in an act 606 of FIG. 6, the dynamic base limit value allocation system 106 selects a base limit value tiered data table from multiple base limit value tiered data tables utilizing an activity score 602 (and/or user activity data 604). In particular, as shown in FIG. 6, each base limit value tiered data table corresponds to a varying risk category or risk segment (e.g., low risk, medium risk, and high risk). As mentioned above, the dynamic base limit value allocation system 106 can utilize the activity score 602 to determine a risk category (or segment) for a user account (e.g., a first range of activity scores can correspond to a low risk level and a second range of activity scores can correspond to a high risk level). In some instances, the dynamic base limit value allocation system 106 selects the base limit value tiered data table (in the act 606 of FIG. 6) that matches with to a risk level of an activity score (e.g., activity score 602) generated for a user account. As shown in FIG. 6, the dynamic base limit value allocation system 106 selects the base limit value tiered data table for the medium risk level as the base limit value model 608.

As further illustrated in FIG. 6, the base limit value model 608 (e.g., a base limit value tiered data table) includes base limit values and user activity conditions to progress to a subsequent tier of the base limit value. For example, as shown in FIG. 6, the dynamic base limit value allocation system 106 can determine a base limit value 610 based on the user activity data 604. For example, the dynamic base limit value allocation system 106 can determine a base limit value of 20 when the user activity data 604 indicates that a user account has satisfied the user activity condition (e.g., a deposit transaction of 200) for at least zero months. Furthermore, the dynamic base limit value allocation system 106 can determine a base limit value of 30 for the user account when the user activity data 604 indicates that the user account has satisfied the user activity condition of a deposit transaction of 300 for at least one month. In addition, as also shown in FIG. 6, the dynamic base limit value allocation system 106 can determine a base limit value of 200 for the user account when the user activity data 604 indicates that the user account has satisfied the user activity condition of a deposit transaction of 2000 dollars for at least two months (after satisfying the previous user activity conditions in the base limit value tiered data table).

In some embodiments, the dynamic base limit value allocation system 106 can directly determine a higher base limit value (e.g., 200). For instance, the dynamic base limit value allocation system 106 can identify that the user account activity data of a user account indicates that a user activity condition of a deposit transaction for the higher base limit value has been performed by the user account for a number of months having a sum that totals the number of months in the base limit value tiered data table from the lowest base limit value to the determined base limit value. Accordingly, the dynamic base limit value allocation system 106, in some embodiments, directly assigns the higher base limit value to a user account having such user activity data.

In addition, as shown in FIG. 6, the dynamic base limit value allocation system 106 can also determine a subsequent base limit value 612 from the base limit value model 608 (e.g., a base limit value tiered data table). In reference to the base limit value model 608 of FIG. 6 (representing a base limit value tiered data table), the dynamic base limit value allocation system 106 can select a next tier base limit value from a determined base limit value as the subsequent base limit value. For instance, in a base limit value tiered data table, the dynamic base limit value allocation system 106 can select the next base limit value on the next tier (e.g., on the next row of a tiered data table) as the subsequent base limit value. As an example, in the base limit value model 608 of FIG. 6, the dynamic base limit value allocation system 106 can determine that 30 is the subsequent base limit value when the determined base limit value for a user account is 20.

Furthermore, as illustrated in FIG. 6, the dynamic base limit value allocation system 106 can also determine one or more user activity conditions to achieve a subsequent base limit value 614 from the base limit value model 608 (e.g., a base limit value tiered data table). For example, the dynamic base limit value allocation system 106 can select the user activity conditions corresponding to the subsequent base limit value tier in the tiered data table as the user activity conditions that achieve the subsequent base limit value. For example, in the base limit value model 608 of FIG. 6, the dynamic base limit value allocation system 106 can determine that a user activity condition of a deposit transaction of 300 for one month to achieve a subsequent base limit value of 30 when the determined base limit value for a user account is 20.

In one or more embodiments, the dynamic base limit value allocation system 106 generates each base limit value tiered data table from a set of base limit value tiered data tables to be configured for a set of user accounts based on activity scores. In particular, the dynamic base limit value allocation system 106 can associate a first base limit value tiered data table to a first activity score by selecting (or generating) values for the first base limit value tiered data table to reflect a risk level represented by the first activity score (e.g., user activity conditions that are less stringent based on a low risk level associated with a user account). In addition, the dynamic base limit value allocation system 106 can associate a second base limit value tiered data table to a second activity score by selecting (or generating) values for the second base limit value tiered data table to reflect a risk level represented by the second activity score (e.g., user activity conditions that are more stringent based on a high risk level associated with a user account).

Although one or more embodiments illustrate the dynamic base limit value allocation system 106 categorizing base limit value tiered data tables based on risk levels, the dynamic base limit value allocation system 106 can utilize various metrics from various types of activity scores to categorize and/or select base limit value tiered data tables. For example, the dynamic base limit value allocation system 106 can utilize metrics such as, but not limited to, an interest (or satisfaction) value of a user account, a conversion probability for the user account, and/or a loyalty of the user account to categorize (and/or configure) base limit value tiered data tables. In addition, the dynamic base limit value allocation system 106 can utilize an activity score that corresponds to the various metrics to select a base limit value tiered data table in accordance with one or more embodiments herein.

Additionally, although one or more embodiments describes a deposit transaction activity as the user activity condition for the base limit value tiered data tables, the dynamic base limit value allocation system 106 can utilize various user activity data for the user activity condition in the base limit value tiered data tables. For example, the user activity condition within a base limit value tiered data table can include a user-to-user transaction activity and/or a spending transaction activity. In addition, the base limit value tiered data table can include various combinations of the user activity conditions such as, but not limited to, a user-to-user transaction activity and a number of times the user-to-user transaction activity occurs and/or a spending transaction activity frequency and a value amount of the spending transaction activities.

In one or more embodiments, the values associated with a base limit value model (e.g., a base limit value matrix and/or a base limit value tiered data table) can be generated (or populated) utilizing a machine learning model. As an example, the dynamic base limit value allocation system 106 can train a machine learning model (e.g., a decision tree model, a regression model, a classification model) to determine (or predict) base limit values for varying activity scores and/or user activity conditions (e.g., mappings that are likely to result in a non-default success rate that satisfies a threshold non-default success rate). Then, the dynamic base limit value allocation system 106 can utilize the machine learning model to generate a base limit value model by populating data values of the base limit value model based on the determined base limit values and predicted mappings to user activity conditions and/or activity scores.

In some embodiments, the values corresponding to the base limit value model can be configured and/or modified by an administrator user on an administrator device. For instance, the dynamic base limit value allocation system 106 can receive a selection and/or input value for a particular value or element within the base limit value model. Then, the dynamic base limit value allocation system 106 can utilize the selection and/or input to modify a base limit value, activity score, and/or a user activity condition within the base limit value model. As an example, the dynamic base limit value allocation system 106 can receive a user interaction from an administrator device to modify the base limit value associated with a user activity condition of a deposit transaction of 300 from a base limit value of 30 to 35.

Although one or more embodiments describes the dynamic base limit value allocation system 106 utilizing a base limit value model and activity score (from the activity machine learning model) to determine base limit values, the dynamic base limit value allocation system 106 an utilize the base limit value model and activity score to determine various types of values for a user account. For instance, the dynamic base limit value allocation system 106 can determine a lending credit value (and subsequent lending credit value) for a user account in accordance with one or more embodiments herein. In some embodiments, the dynamic base limit value allocation system 106 can determine a credit line (and subsequent credit line) for a user account in accordance with one or more embodiments herein. Furthermore, the dynamic base limit value allocation system 106 can also determine a transfer limit (and subsequent transfer limit) for a user account in accordance with one or more embodiments herein.

Figure 7:
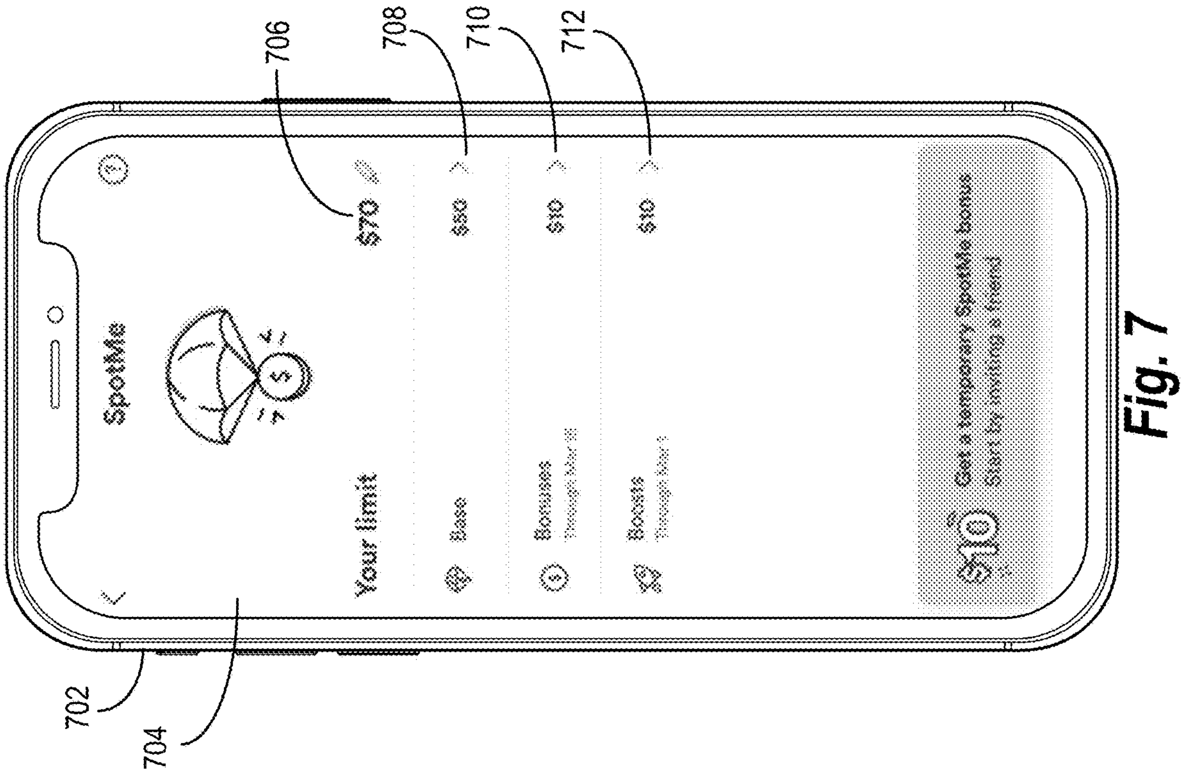
FIG. 7 illustrates a dynamic base limit value allocation system generating user interface elements to display a base limit value in accordance with one or more implementations.

As previously mentioned, the dynamic base limit value allocation system 106 can generate and display user interface elements to transparently and efficiently present base limit values. For instance, FIG. 7 illustrates the dynamic base limit value allocation system 106 generating and displaying a graphical user interface that displays a determined base limit value for a user account. As shown in FIG. 7, the dynamic base limit value allocation system 106 provides for display, within a graphical user interface 704 of a client device 702, a user interface element 706 that displays a total base limit value corresponding to a user account that accounts for a base limit value and various modifiers to the base limit value. Indeed, as shown in FIG. 7, the dynamic base limit value allocation system 106 provides for display, within the graphical user interface 704, a user interface element 708 that displays a base limit value determined from a base limit value model. In addition, the dynamic base limit value allocation system 106 also provides for display, within the graphical user interface 704, user interface elements 710 and 712 that modify the base limit value and also provide an explanation for the modification to the base limit value (e.g., a temporary modifier to the base limit value).

Indeed, as illustrated in FIG. 7, the dynamic base limit value allocation system 106 provides for display, within the graphical user interface 704, user interface elements that indicate that a user account has available an excess utilization buffer balance of 70 dollars in which the determined base limit value is 50 dollars and 20 dollars of modifiers based on actions taken on the user account.

Furthermore, the dynamic base limit value allocation system 106 can also generate and display a graphical user interface that displays the base limit value, a subsequent base limit value, and user activity conditions to achieve the subsequent base limit value from a base limit value model. For example, in some implementations, the dynamic base limit value allocation system 106 provides for display, within a graphical user interface of the client device, information corresponding to the base limit value determined for the user account. For instance, the dynamic base limit value allocation system 106 can provide for display, within a graphical user interface, a base limit value and one or more user interface elements that indicate a subsequent base limit value for the user account and user activity conditions to achieve the subsequent base limit value.

Additionally, in one or more embodiments, the dynamic base limit value allocation system 106 can determine (and display) base limit values using base limit value models (e.g., base limit matrices and/or base limit value tiered data tables) as described in U.S. application Ser. No. 17/519,129, the contents of which are herein incorporated by reference in their entirety.

Furthermore, in one or more instances, the dynamic base limit value allocation system 106 also utilizes modifiers (e.g., boosts and/or bonuses) based on digital user account actions to further modify the base limit value. For instance, the available base limit value (as described herein) can include a base limit value that is modified using a variety of modifiers from one or more digital user account actions (e.g., setting up direct deposit, transmitting referrals) and/or other event-based triggers (e.g., natural disaster relief, holidays). As an example, the dynamic base limit value allocation system 106 can modify a base limit value (to generate an available base limit value for a user account) as described in U.S. application Ser. No. 18/498,776 filed Oct. 31, 2023, entitled GENERATING USER INTERFACES COMPRISING DYNAMIC BASE LIMIT VALUE AND BASE LIMIT VALUE MODIFIER USER INTERFACE ELEMENTS DETERMINED FROM DIGITAL USER ACCOUNT ACTIONS, the contents of which are herein incorporated by reference in their entirety.

Figure 8:
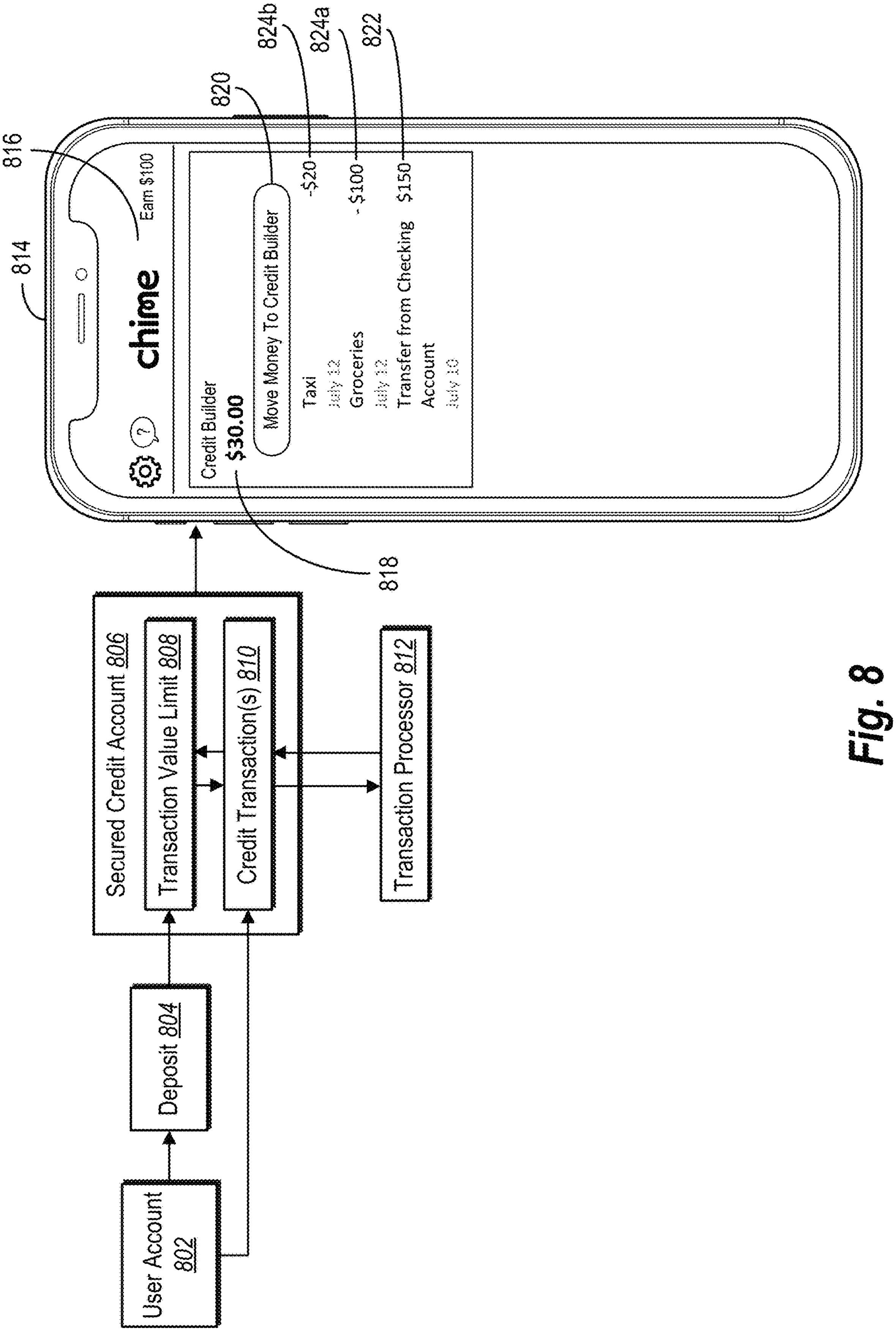
FIG. 8 illustrates a dynamic base limit value allocation system utilizing a transaction value limit to facilitate one or more digital transactions in a secured credit account in accordance with one or more implementations.

As mentioned above, the dynamic base limit value allocation system 106 can facilitate digital transactions within a secured credit account utilizing a transaction value limit. For example, FIG. 8 illustrates the dynamic base limit value allocation system 106 utilizing a transaction value limit to facilitate one or more digital transactions in a secured credit account corresponding to a user account. Indeed, FIG. 8 illustrates a flow diagram of the dynamic base limit value allocation system 106 facilitating digital transactions within a secured credit account utilizing a transaction value limit and displaying the modifications to the secured credit account (e.g., changes in the transaction value limit, digital transactions).

As shown in FIG. 8, the dynamic base limit value allocation system 106 detects a deposit 804 from a user account 802 for a secured credit account 806. Indeed, as shown in FIG. 8, the dynamic base limit value allocation system 106 utilizes a deposited value corresponding to the deposit 804 generate a transaction value limit 808. In one or more cases, the dynamic base limit value allocation system 106 increases the transaction value limit 808 upon receiving one or more deposits (e.g., deposit 804).

Indeed, as further shown in FIG. 8, the dynamic base limit value allocation system 106 provides, for display within a graphical user interface 816 of a client device 814 (of the user account 802), a user interface element 822 to indicate the deposit 804 (e.g., a transfer of $150). As an example, the dynamic base limit value allocation system 106 can further determine the transaction value limit from the deposit 804 and display the transaction value limit (within a user interface element 818). To illustrate, upon initially receiving the deposit 804 (e.g., a transfer of $150 as indicated by user interface element 822), the dynamic base limit value allocation system 106 can display a transaction value limit of $150 (in the user interface element 818).

In some cases, the dynamic base limit value allocation system 106 can detect various types of deposits and/or transfers to a secured credit account (by a user account). For example, the dynamic base limit value allocation system 106 can detect a deposit from a direct deposit corresponding to the user account. Moreover, the dynamic base limit value allocation system 106 can also detect (or utilize) reoccurring scheduled deposits or transfers to the secured credit account. In some cases, the dynamic base limit value allocation system 106 further utilizes values corresponding to refunds and/or cancelled digital transactions as a deposit value to increase the transaction value limit.

In some cases, the dynamic base limit value allocation system 106 can detect a deposit from a user selected amount to transfer to the secured credit account from one or more other connected transaction accounts (for the user account) and/or one or more third-party transaction accounts (e.g., transaction accounts external to the inter-network facilitation system 104). For example, as shown in FIG. 8, the dynamic base limit value allocation system 106 provides, for display within the graphical user interface 816 of the client device 814, a selectable user interface element 820 to enable a deposit from a user selected amount to transfer to the secured credit account from one or more other connected transaction accounts. For instance, upon receiving a user selection of the selectable user interface element 820, the dynamic base limit value allocation system 106 can display one or more selectable options to select a connected transaction account (e.g., a checking account, savings account) and a deposit amount to transfer (or deposit) a monetary amount to the transaction value limit 808 under the secured credit account 806.

In addition, as shown in FIG. 8, the dynamic base limit value allocation system 106 also detects (or receives) one or more credit transaction(s) 810 from the user account 802. Indeed, as shown in FIG. 8, the dynamic base limit value allocation system 106 identifies the credit transaction(s) 810 corresponding to the secured credit account 806 (e.g., digital transactions based on a transmittal of a credit card utilization, an electronic wallet payment, an online automatic payment transaction). As further shown in FIG. 8, the dynamic base limit value allocation system 106 transmits the credit transaction(s) 810 to one or more transaction processors 812 to facilitate and process the credit transactions (e.g., to credit and/or settle the credit transaction).

Furthermore, as shown in FIG. 8, the dynamic base limit value allocation system 106 utilizes the transaction value limit 808 with the credit transaction(s) 810 to authorize (and/or facilitate) the credit transaction(s) 810. For example, as shown in FIG. 8, the dynamic base limit value allocation system 106 provides, for display within the graphical user interface 816 of the client device 814, user interface elements 824*a* and 824*b* to indicate detected credit transaction (s) 810 (e.g., a credit transaction labeled as "Groceries" for $100, a credit transaction labeled as "Taxi" for $20). As further shown in FIG. 8, the dynamic base limit value allocation system 106 utilizes credit transaction(s) 810 as indicated in the user interface elements 824*a* and 824*b* to modify the transaction value limit 808 (as displayed in the user interface element 818). Indeed, as shown in FIG. 8, the dynamic base limit value allocation system 106 displays, within the user interface element 818, a modified transaction value limit of $30 based on utilizing a $120 (for the credit transactions indicated in the user interface elements 824*a* and 824*b*) from an original transaction value limit of $150 (from the deposit indicated in the user interface element 822).

In one or more embodiments, the dynamic base limit value allocation system 106 utilizes a secured credit account and a transaction value limit (e.g., a credit builder account and credit limit) as described in U.S. application Ser. No. 17/021,939 filed Sep. 15, 2020, entitled GENERATING CREDIT BUILDING RECOMMENDATIONS THROUGH MACHINE LEARNING ANALYSIS OF USER ACTIVITY-BASED FEEDBACK, the contents of which are herein incorporated by reference in their entirety.

Figure 9:
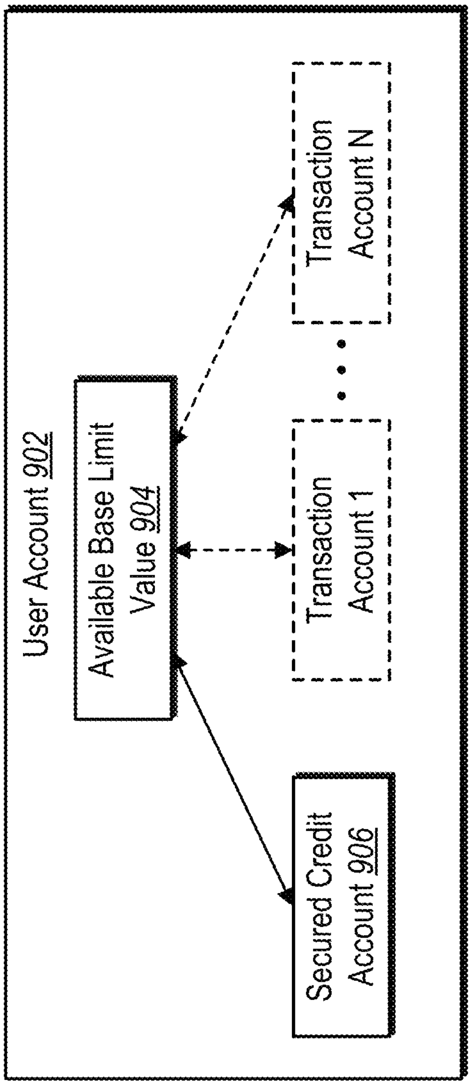
FIG. 9 illustrates a dynamic base limit value allocation system utilizing a universally accessible base limit value over multiple connected accounts in accordance with one or more implementations.

As previously mentioned, the dynamic base limit value allocation system 106 can dynamically determine, track, modify, and display a base limit value across digital transactions detected on multiple connected accounts corresponding to a user account. For instance, FIG. 9 illustrates the dynamic base limit value allocation system 106 utilizing a universally accessible base limit value over multiple connected accounts. In particular, FIG. 9 illustrates the dynamic base limit value allocation system 106 utilizing a universal base limit value across one or more transaction accounts (e.g., a secured credit account 906, transaction accounts 1-N) under a user account 902.

Indeed, as shown in FIG. 9, the dynamic base limit value allocation system 106 can determine and track an available base limit value 904 universally within a user account 902 (e.g., independently from one or more of the connected accounts in the user account 902). For instance, the dynamic base limit value allocation system 106 enables access to the available base limit value 904 within the secured credit account 906 and the one or more transaction accounts 1–N. In each of the secured credit account 906 and the one or more transaction accounts 1–N, the dynamic base limit value allocation system 106 provides an up to date value for the available base limit value 904. Moreover, upon detecting a digital transaction and utilization of the available base limit value in one of the secured credit account 906 and/or the one or more transaction accounts 1–N, the dynamic base limit value allocation system 106 reflects the utilization within the universally accessible available base limit value 904 such that one or more of the other the secured credit account 906 and/or the one or more transaction accounts 1–N receive an updated value of the universally accessible available base limit value 904 (in real time and/or near-real time).

As an example, in reference to FIG. 9, upon detecting a digital transaction within the secured credit account 906 that utilizes a portion of the available base limit value 904, the dynamic base limit value allocation system 106 can modify the available base limit value 904 to reflect the utilization. Moreover, the dynamic base limit value allocation system 106, upon detecting an additional digital transaction within the transaction account 1 that also utilizes an additional portion of the available base limit value 904, can modify the available base limit value 904 to reflect the additional utilization. Subsequently, upon receiving an additional digital transaction within the secured credit account 906, the dynamic base limit value allocation system 106 can detect that the digital transaction value exceeds the available base limit value 904 (in combination with the transaction value limit) and can reject the digital transaction based on the universally accessible available base limit value 904. Although the above-mentioned example describes a specific example, the dynamic base limit value allocation system 106 can utilize (and/or modify) the universally accessible available base limit value 904 based on various combinations of activity detected within the multiple connected accounts.

Figure 10:
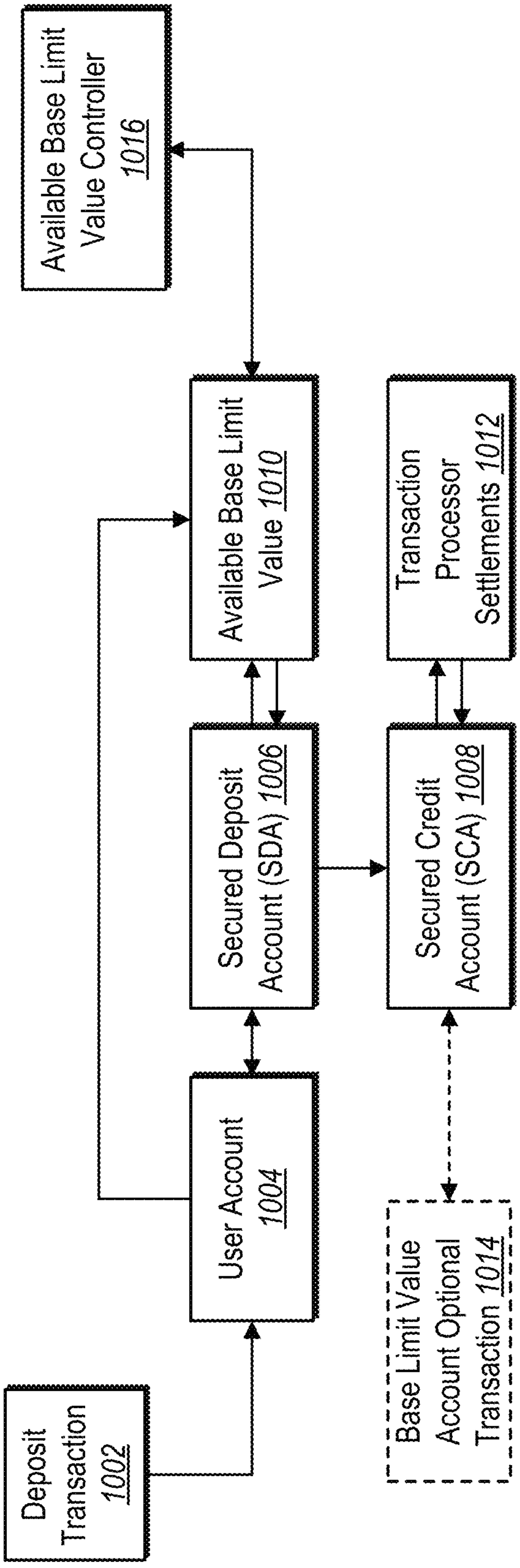
FIG. 10 illustrates a flow diagram of a dynamic base limit value allocation system utilizing an available base limit value within a secured credit account in accordance with one or more implementations.

As mentioned above, the dynamic base limit value allocation system 106 can utilize a universally accessible (via multiple connected transaction accounts) base limit value with a transaction value limit of a secured credit account to enable one or more digital transactions within the secured credit account. For instance, FIG. 10 illustrates a flow diagram of the dynamic base limit value allocation system 106 utilizing an available base limit value within a secured credit account. Indeed, FIG. 10 illustrates the dynamic base limit value allocation system 106 utilizing a base limit value with a transaction value limit in a secured deposit account of a secured credit account to facilitate one or more transactions within a secured credit account.

For instance, as shown in FIG. 10, the dynamic base limit value allocation system 106 receives a deposit transaction 1002 for a user account 1004. In addition, as shown in FIG. 10, the dynamic base limit value allocation system 106 utilizes the deposit transaction 1002 of the user account to fund (or transfer funds) to a secured deposit account (SDA) 1006 corresponding to a secured credit account (SCA) 1008. Indeed, the dynamic base limit value allocation system 106 can utilize the secured deposit account (SDA) 1006 with funds transferred from the user account 1004 as a secured line of credit (i.e., a transaction value limit). In addition, as shown in FIG. 10, the dynamic base limit value allocation system 106 also enables an available base limit value 1010, from the user account 1004, for the secured deposit account (SDA) 1006.

Furthermore, as shown in FIG. 10, the dynamic base limit value allocation system 106 enables communications between the secured credit account (SCA) 1008 and transaction processor settlements 1012 to detect one or more digital transactions. Indeed, the transaction processor settlements 1012 can track and charge one or more digital transactions (e.g., credit card transactions, digital wallet transactions) and establish a settlement amount for the digital transactions. In some cases, the transaction processor settlements can include one or more credit accounts enabled by the inter-network facilitation system 104, third-party credit card services, and/or external banking systems.

Upon detecting one or more digital transactions (via the transaction processor settlements 1012), the dynamic base limit value allocation system 106 can utilize (e.g., via freezing or reserving) funds from a transaction value limit balance available within the secured deposit account (SDA) 1006 to reconcile (or cover) a balance of the secured credit account (SCA) 1008 resulting from the one or more digital transactions. In addition, upon detecting a digital transaction and determining that the transaction value limit balance available within the secured deposit account (SDA) 1006 does not cover the transaction value of the digital transaction, the dynamic base limit value allocation system 106 utilizes the available base limit value 1010 to fulfill (or cover) the remainder between the transaction value of the digital transaction and the transaction value limit balance (in accordance with one or more implementations herein).

Indeed, the dynamic base limit value allocation system 106 can freeze and/or reserve funds from the transaction value limit balance available within the secured deposit account (SDA) 1006 and/or the available base limit value 1010 to enable the digital transaction from the transaction processor settlements 1012. In one or more instances, the dynamic base limit value allocation system 106 utilizes the reserved and/or frozen funds from the transaction value limit balance available within the secured deposit account (SDA) 1006 and/or the available base limit value 1010 to settle (or pay) the transaction processor settlements 1012 for one or more digital transactions.

Furthermore, as shown in FIG. 10, the dynamic base limit value allocation system 106 can utilize an available base limit value controller 1016 to universally track the available base limit value across multiple connected accounts. For instance, the dynamic base limit value allocation system 106 can utilize the available base limit value controller 1016 to reserve and/or freeze a portion of the available base limit value utilized by the secured credit account (SCA) 1008. In some cases, the dynamic base limit value allocation system 106 utilizes the available base limit value controller 1016 to transmit (or communicate) updates to the available base limit value (based on utilizations by the secured credit account (SCA) 1008) to one or more other connected transaction accounts. Moreover, the dynamic base limit value allocation system 106 can utilize the available base limit value controller 1016 to receive updates to the available base limit value (based on utilizations by the other transaction accounts) to provide an accurate available base limit value balance to the secured credit account (SCA) 1008 and/or the secured deposit account (SDA) 1006.

Additionally, in reference to FIG. 10, the dynamic base limit value allocation system 106 can receive additional deposit transactions from the user account 1004 within the secured deposit account (SDA) 1006. In response to the additional deposit transactions, the dynamic base limit value allocation system 106 can cause the secured deposit account (SDA) 1006 to settle exceeded transaction amounts within the secured credit account (SCA) 1008 (as described in FIG. 15). Moreover, the dynamic base limit value allocation system 106 can cause the secured deposit account (SDA) 1006 to reinstate (or replenish) an available base limit value 1010 (to cover a utilized amount of the available base limit value) with funds from the deposit transaction. Furthermore, the dynamic base limit value allocation system 106 can also increase a transaction value limit balance in the secured deposit account (SDA) 1006 from the deposit transaction (e.g., using a remainder of the deposit transaction after reinstating a utilized amount of the available base limit value). Indeed, the dynamic base limit value allocation system 106 can utilize additional deposit transactions to settle the secured credit account (SCA) 1008, reinstate the available base limit value 1010, and/or a transaction value limit balance of the secured deposit account (SDA) 1006 as described herein (e.g., in relation to FIGS. 13-15).

In some cases, the dynamic base limit value allocation system 106 receives optional transactions (e.g., base limit value account optional transaction 1014) with the secured credit account (SCA) 1008 (from a user of the user account 1004). For example, the dynamic base limit value allocation system 106 can receive a supplemental tip for the available base limit value service. Indeed, the dynamic base limit value allocation system 106 can receive an optional user allotted tip amount for the inter-network facilitation system 104.

In some instances, the dynamic base limit value allocation system 106 communicates, transmits, and/or processes one or more deposit transactions, digital transactions, available base limit values, and/or secured credit settlements utilizing a platform including various transaction computer networks within the inter-network facilitation system 104. For example, in one or more implementations, the dynamic base limit value allocation system 106 communicates, transmits, and/or processes one or more deposit transactions, digital transactions, available base limit values, and/or secured credit settlements utilizing one or more transaction computer network platforms as described in U.S. application Ser. No. 17/805,385 filed Jun. 3, 2022, entitled GENERATING AND PUBLISHING UNIFIED TRANSACTION STREAMS FROM A PLURALITY OF COMPUTER NETWORKS FOR DOWNSTREAM COMPUTER SERVICE SYSTEMS, the contents of which are herein incorporated by reference in their entirety (e.g., FIG. 6).

Figure 11:
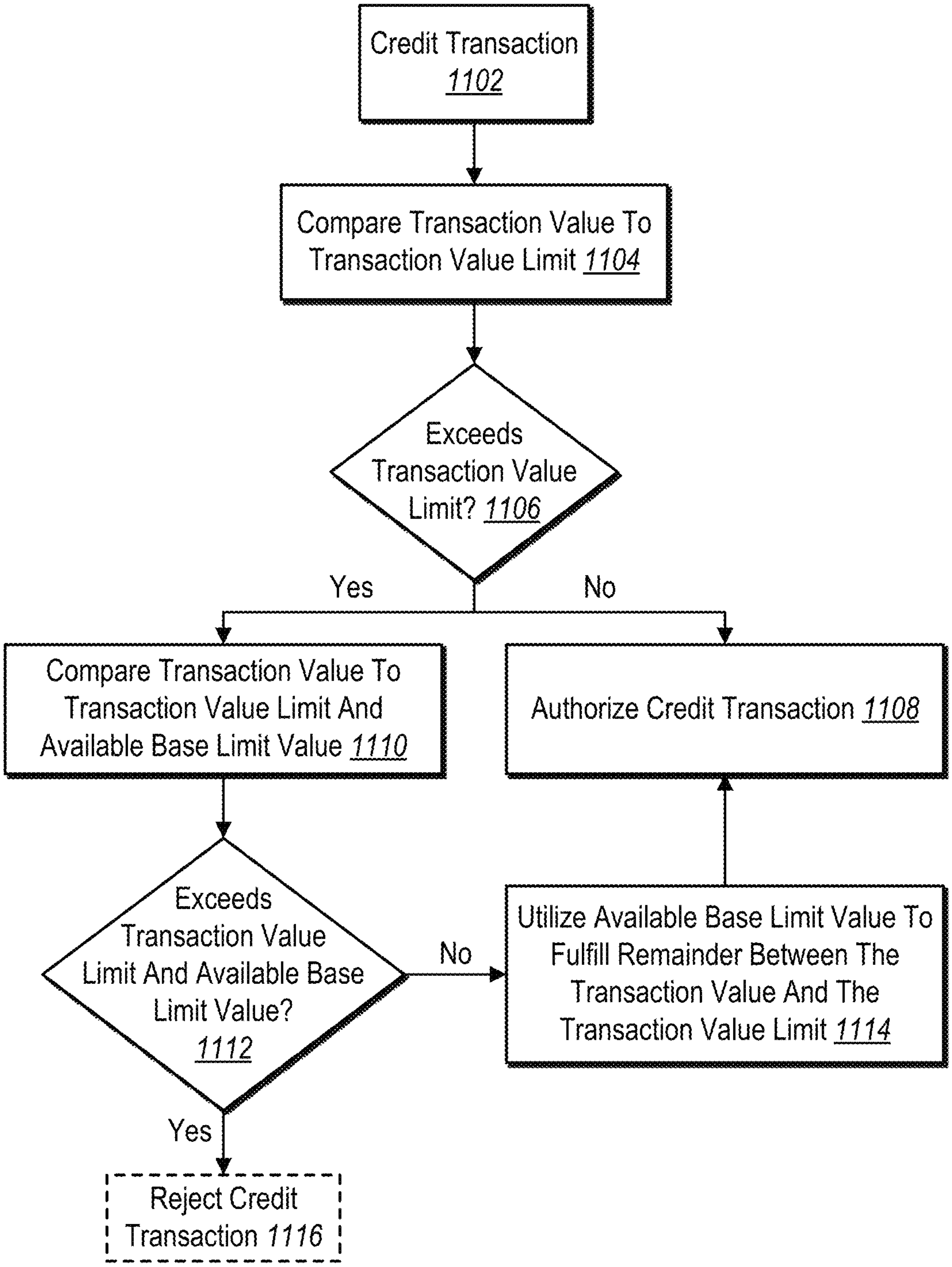
FIG. 11 illustrates a flow diagram of a dynamic base limit value allocation system authorizing a credit transaction based on a transaction value limit and an available base limit value in accordance with one or more implementations.

As previously mentioned, the dynamic base limit value allocation system 106 can also utilize the transaction value limit and the base limit value to, accurately and quickly, authorize one or more digital transactions. For instance, FIG. 11 illustrates a flow diagram of the dynamic base limit value allocation system 106 authorizing a credit transaction based on a transaction value limit and an available base limit value. In particular, FIG. 11 illustrates the dynamic base limit value allocation system 106 utilizing a transaction value limit (from a secured credit account) and an available base limit value to check whether to authorize or reject a detected credit transaction.

For instance, as shown in FIG. 11, the dynamic base limit value allocation system 106 receives a credit transaction 1102. Moreover, as shown in FIG. 11, the dynamic base limit value allocation system 106 compares a transaction value (of the credit transaction 1102) to a transaction value limit 1104 (of a secured credit account). Indeed, as shown in act 1106 of FIG. 11, the dynamic base limit value allocation system

106 checks if the transaction value of the credit transaction exceeds the transaction value limit. For instance, in response to determining that the transaction value does not exceed the transaction value limit (e.g., a no indicator in the act 1106), the dynamic base limit value allocation system 106 can authorize the credit transaction (in the act 1108).

Moreover, as further shown in FIG. 11, in response to determining that the transaction value does exceed the transaction value limit (e.g., a yes indicator in the act 1106), the dynamic base limit value allocation system 106 further utilizes an available base limit value. For instance, in the act 1110, the dynamic base limit value allocation system 106 compares the transaction value to the transaction value limit and the available base limit value (e.g., a combination of the transaction value limit and the available base limit value, such as a summation or multiplication). As shown in act 1112 of FIG. 11, the dynamic base limit value allocation system 106 checks if the transaction value exceeds a combination of the transaction value and the available base limit value. For example, as shown in FIG. 11, in response to determining that the transaction value does exceed the combination of the transaction value limit and the available base limit value (e.g., a yes indicator in the act 1112), the dynamic base limit value allocation system 106 can reject the credit transaction (in an act 1116).

Moreover, as shown in FIG. 11, in response to determining that the transaction value does not exceed the combination of the transaction value limit and the available base limit value (e.g., a no indicator in the act 1112), the dynamic base limit value allocation system 106 can utilize the available base limit value to fulfill a remainder between the transaction value and the transaction value limit (in an act 1114). Furthermore, the dynamic base limit value allocation system 106 can also authorize the credit transaction (in an act 1108). Additionally, the dynamic base limit value allocation system 106 can compare the credit transaction value to an available base limit value (in the act 1110) that is universally accessible by multiple connected accounts (as described in FIG. 9).

Furthermore, the dynamic base limit value allocation system 106 can utilize the available base limit value to fulfill a remainder between the transaction value and the transaction value limit (in the act 1114) in accordance with one or more implementations herein (e.g., in reference to FIG. 10). For instance, in some cases, the dynamic base limit value allocation system 106 in response to determining that the base limit value accessible by the user account covers the excess of the transaction value, the dynamic base limit value allocation system 106 can authorize the transaction and reserve a portion of the base limit value to cover the excess of the transaction value. Furthermore, at the time (or near the time) at which a user payment is processed for a balance on the secured credit account (e.g., using the transaction value limit generated from user received deposits in a secured deposit account of the secured credit account), the dynamic base limit value allocation system 106 can utilize the reserved portion of the base limit value to cover the excess balance on the secured credit account.

Figure 12A:
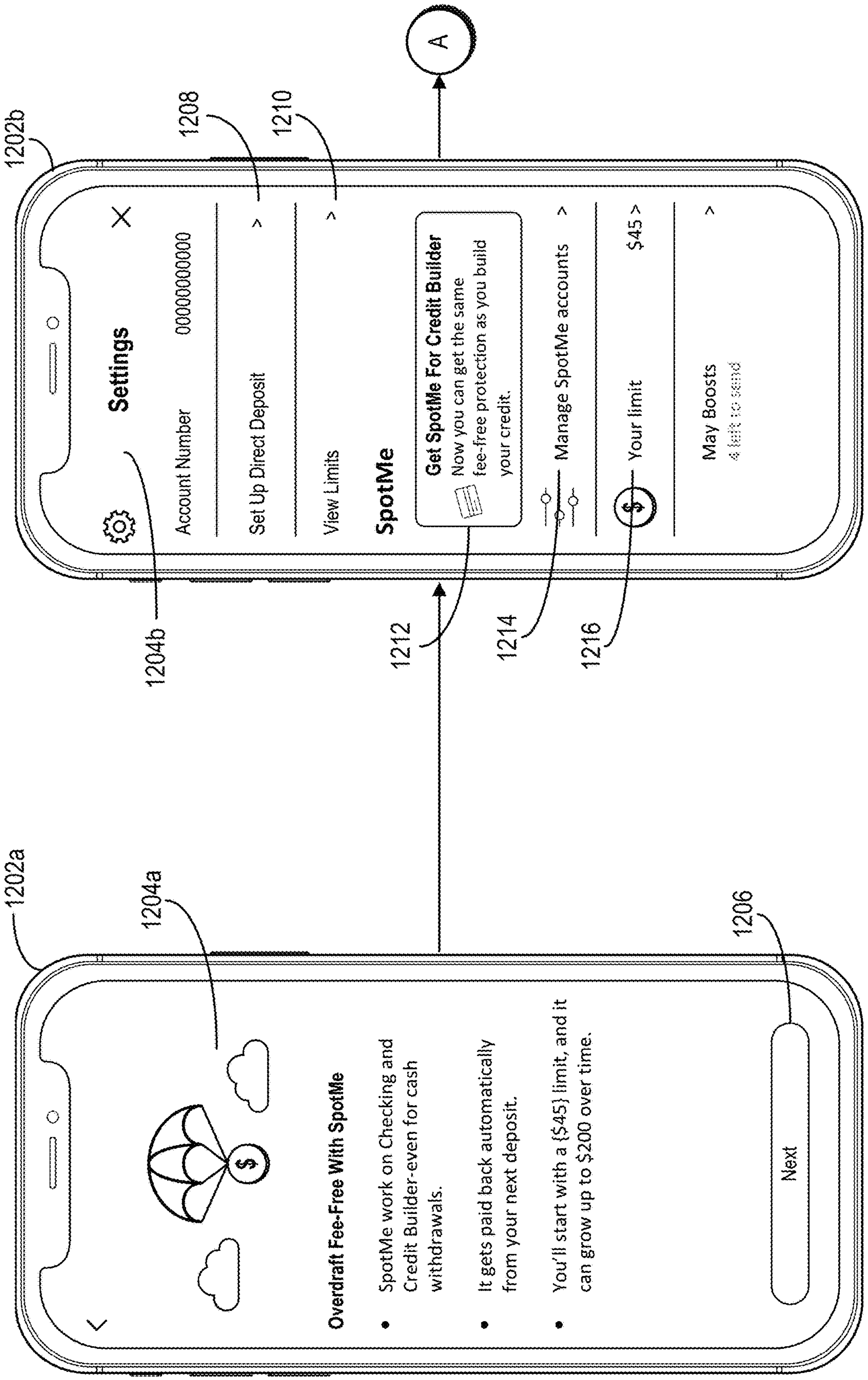
FIGS. 12A and 12B illustrate a dynamic base limit value allocation system displaying one or more selectable user interface elements to configure an accessible base limit value in accordance with one or more implementations.
Figure 12B:
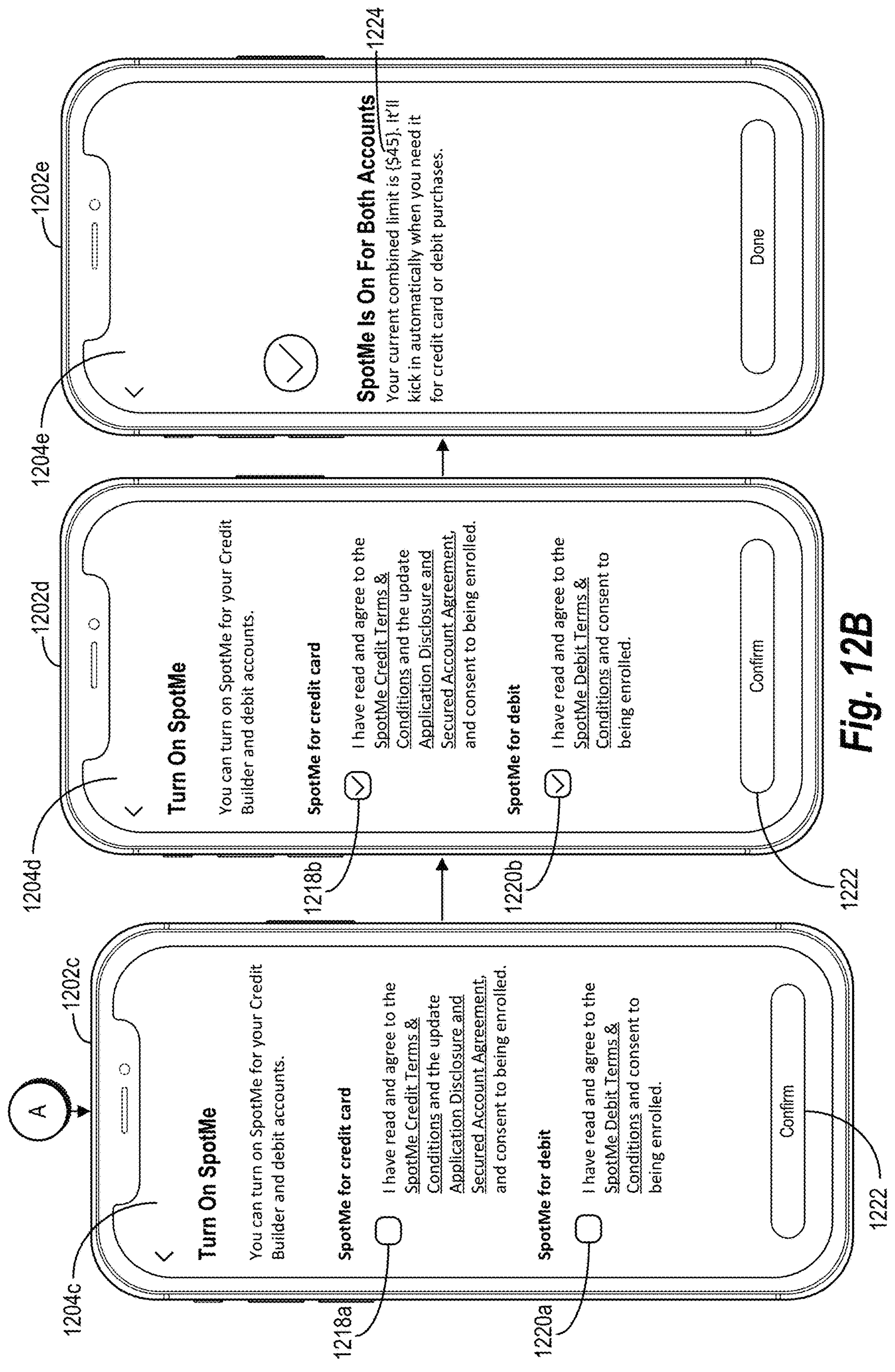

In one or more embodiments, the dynamic base limit value allocation system 106 displays one or more user interface elements to setup and/or configure a universally accessible base limit value. For instance, FIGS. 12A and 12B illustrate the dynamic base limit value allocation system 106 displaying one or more selectable user interface elements to configure and/or setup the accessible base limit value. For instance, as shown in FIG. 12A, the dynamic base limit value allocation system 106 can provide, for display within a graphical user interface 1204*a* of a client device 1202*a*, a selectable user interface element 1206 to initiate a setup process for an available base limit value (e.g., a SpotMe amount).

As further shown in FIG. 12A, the dynamic base limit value allocation system 106, upon receiving a user selection of the selectable user interface element 1206, provides for display within a graphical user interface 1204*b* of the client device 1202*b*, settings for an available base limit value (determined in accordance with one or more implementations herein). For instance, as shown in FIG. 12A, the dynamic base limit value allocation system 106 displays, within the graphical user interface 1204*b*, a selectable user interface element 1208 to set up a direct deposit (e.g., a deposit transaction) that, upon selection, navigates to one or more selectable options to complete and/or setup a direct deposit for the user account.

Moreover, as shown in FIG. 12A, the dynamic base limit value allocation system 106 displays, within the graphical user interface 1204*b*, a selectable user interface element 1210 and a selectable user interface element 1216. Indeed, upon selection of either the selectable user interface element 1210 and/or the selectable user interface element 1216, the dynamic base limit value allocation system 106 can navigate to information for the available base limit value (in accordance with one or more implementations herein). In some cases, dynamic base limit value allocation system 106 can also navigate to a graphical user interface that displays the subsequent base limit value and/or one or more activity conditions to achieve the subsequent base limit value (in accordance with one or more implementations herein).

As further shown in FIG. 12A, the dynamic base limit value allocation system 106 also displays a selectable user interface element 1212 to setup access to the available base limit value in a secured credit account (e.g., a Credit Builder account) of the user account. Upon receiving a user selection of the selectable user interface element 1212, the dynamic base limit value allocation system 106 can automatically enable access to the available base limit value in the secured credit account. Indeed, the dynamic base limit value allocation system 106 can enable the available base limit value for the secured credit account in accordance with one or more implementations herein.

Additionally, as also shown in FIG. 12A, the dynamic base limit value allocation system 106 displays a selectable user interface element 1214 that navigates to settings for enabling the available base limit value of a user account on one or more connected transaction accounts. For instance, as shown in the transition from FIG. 12A to FIG. 12B, the dynamic base limit value allocation system 106, upon receiving a user selection of the selectable user interface element 1214, provide, for display within a graphical user interface 1204*c* of the client device 1202*c*, one or more selectable elements to select, for access to the available base limit value, a secured credit account or one or more additional transaction accounts. Indeed, as shown in FIG. 12B, the dynamic base limit value allocation system 106 displays a selectable user interface element 1220*a* to enable access to the available base limit value in a transaction account (e.g., a debit card account) and a selectable user interface element 1218*a* to enable access to the available base limit value in a secured credit account (e.g., a credit card account).

As further shown in FIG. 12B, the dynamic base limit value allocation system 106, upon receiving a user selection of the selectable user interface element 1218*a* and the selectable user interface element 1220*a*, displays toggled selectable user interface element 1218*b* and toggled selectable user interface element 1220*b* indicating a selection of the user interface elements (within the graphical user interface 1204*d* of client device 1202*d*). In addition, as shown in FIG. 12B, the dynamic base limit value allocation system 106, upon receiving a user interaction with a selectable user interface element 1222 confirming the user selection of the available base limit value accessible transaction accounts, displays, within the graphical user interface 1204*e* of the client device 1202*e*, an indication 1224 confirming that the available base limit value is activated for the selected transaction accounts. Although FIG. 12B illustrates a specific combination of transaction accounts selected within a graphical user interface for access to the available base limit value, the dynamic base limit value allocation system 106 can display various numbers of selectable user interface elements for a number of transaction accounts and enable access to the available base limit value for various combinations of transaction accounts based on the user selections.

In some cases, the dynamic base limit value allocation system 106 can deactivate an available base limit value for a secured credit account. In particular, the dynamic base limit value allocation system 106 can receive a user selection to disable the available base limit value for the secured credit account and, in response, can disable access to the available base limit value for one or more credit transactions in the secured credit account. Moreover, upon reactivation of the available base limit value for the secured credit account, the dynamic base limit value allocation system 106 can enable access to the available base limit value for one or more credit transactions in the secured credit account.

Figure 13A:
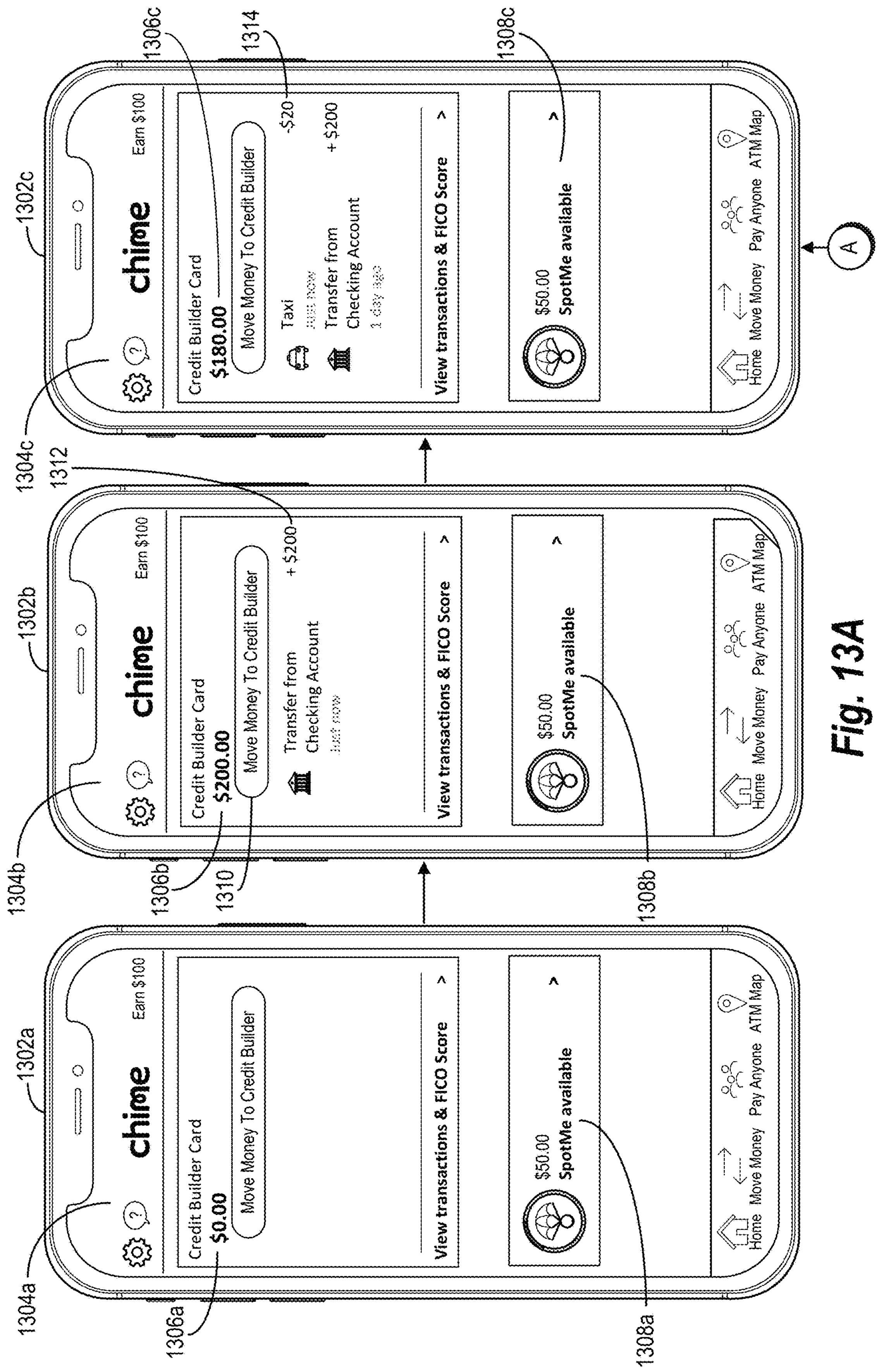
FIGS. 13A-13D illustrate a dynamic base limit value allocation system determining modifications and displaying modifications to an available base limit value and a transaction value limit in accordance with one or more implementations.
Figure 13B:
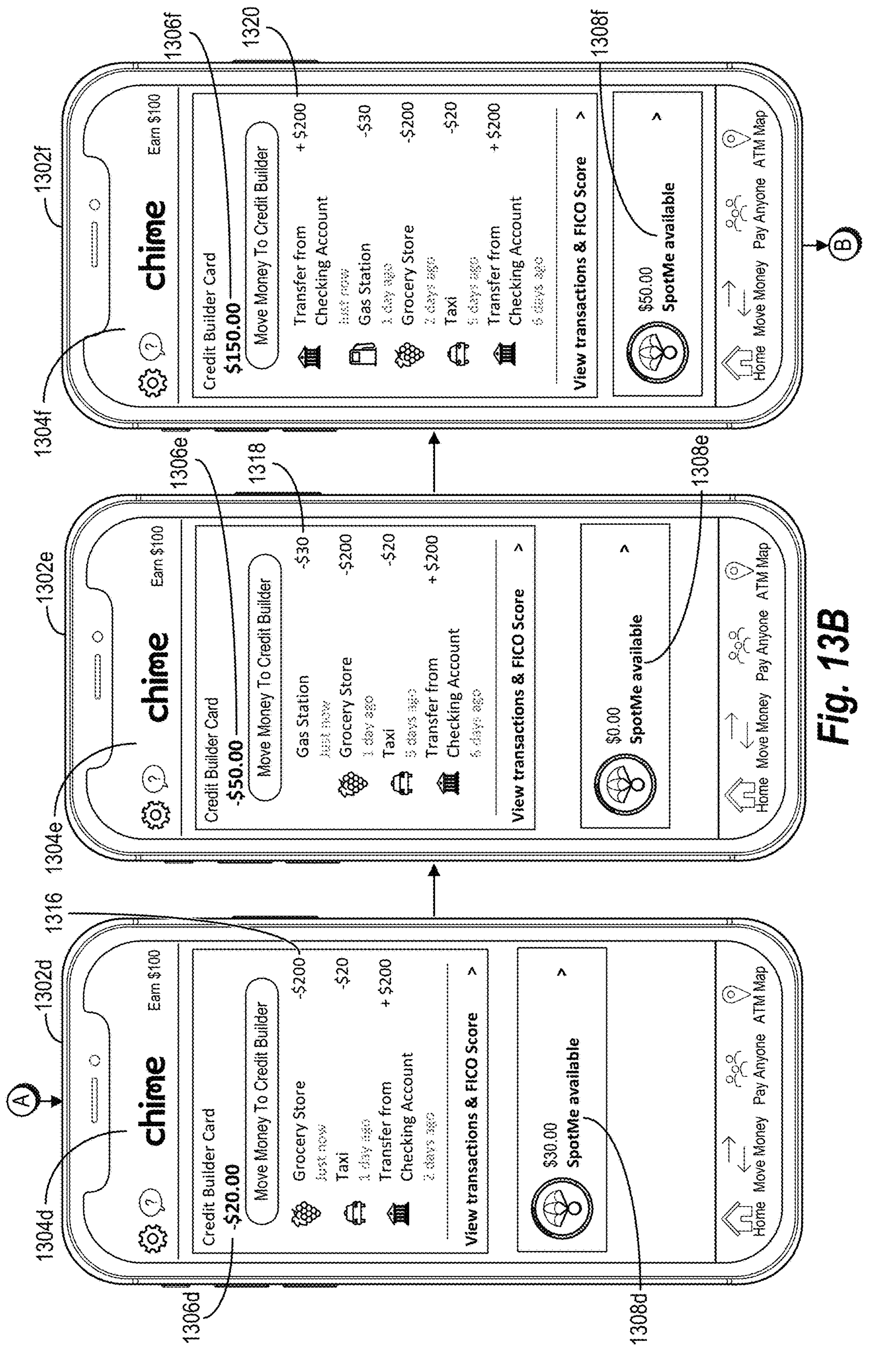
Figure 13C:
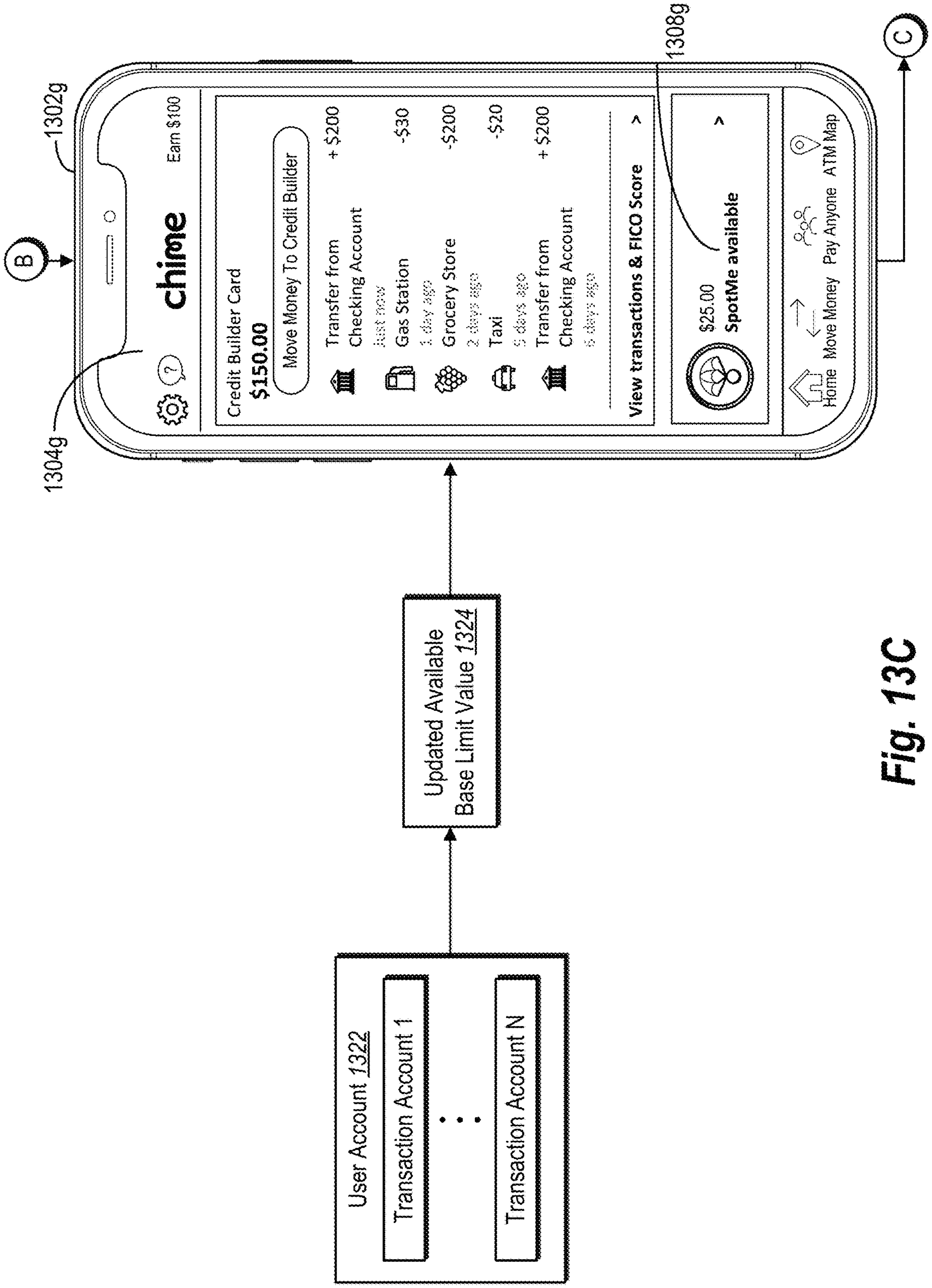

As previously mentioned, the dynamic base limit value allocation system 106 can display modifications to an available base limit value and/or a transaction value limit based on one or more digital transactions. For instance, FIGS. 13A-13C illustrate the dynamic base limit value allocation system 106 determining modifications and displaying modifications to an available base limit value and/or a transaction value limit in response to digital transactions in a secured credit account. Indeed, FIGS. 13A-13C illustrate the dynamic base limit value allocation system 106 detecting digital transactions (e.g., credit transactions), utilizing an available base limit value to fulfill one or more digital transactions, and displaying modified available base limit value and transaction value limit in response to the digital transactions (in accordance with one or more implementations herein).

As shown in FIG. 13A, the dynamic base limit value allocation system 106 provides, for display within a graphical user interface 1304*a* in a client device 1302*a*, a transaction value limit 1306*a* (e.g., $0) and (a universally accessible) available base limit value 1308*a* (e.g., $50) within a secured credit account a user account. In addition, as shown in FIG. 13A, upon receiving a user interaction with a selectable user interface element 1310 to initiate a deposit transaction within the secured credit account of the user account, the dynamic base limit value allocation system 106 facilitates and displays, within the graphical user interface 1304*b* of the client device 1302*b*, a deposit transaction 1312 (with a deposited value of $200). In addition, as shown in FIG. 13A, the dynamic base limit value allocation system 106 also updates and displays a transaction value limit 1306*b* (e.g., $200) in response to the detected deposit transaction 1312 (e.g., by adding or increasing the transaction value limit by the deposited value). Moreover, as shown in FIG. 13A, the dynamic base limit value allocation system 106 continues to display, within the graphical user interface 1304*b*, an available base limit value 1308*b*.

Additionally, as shown in FIG. 13A, the dynamic base limit value allocation system 106 further detects a digital transaction. Indeed, as shown in FIG. 13A, the dynamic base limit value allocation system 106 provides, for display within the graphical user interface 1304*c* of the client device 1302*c*, a digital transaction 1314 (e.g., a transaction with a taxi of −$20). In addition, the dynamic base limit value allocation system 106 also updates and displays a transaction value limit 1306*c* (e.g., $180 from $200) in response to the detected digital transaction 1314 (e.g., by subtracting or decreasing the transaction value limit by the digital transaction value). In addition, upon determining that the transaction value of the digital transaction 1314 does not exceed the transaction value limit 1306*b*, the dynamic base limit value allocation system 106 continues to display, within the graphical user interface 1304*c*, an available base limit value 1308*c*.

Furthermore, as shown in the transition from FIG. 13A to 13B, the dynamic base limit value allocation system 106 detects a second digital transaction and provides, for display within the graphical user interface 1304*d* of the client device 1302*d*, a digital transaction 1316 (e.g., a transaction with a grocery store of −$200). Moreover, upon determining that the transaction value of the digital transaction 1316 exceeds the transaction value limit 1306*c* (e.g., of $180), the dynamic base limit value allocation system 106 utilizes the transaction value limit 1306*c* to cover a portion of the digital transaction 1316. Furthermore, the dynamic base limit value allocation system 106 utilizes the available base limit value 1308*c* to fulfill a remainder of between the transaction value limit 1306*c* and the digital transaction 1316 (e.g., a remainder of $20 to cover the digital transaction of $200 after a transaction value limit of $180). Accordingly, as shown in FIG. 13B, the dynamic base limit value allocation system 106 displays, within the graphical user interface 1304*d*, a modified transaction value limit 1306*d* (e.g., −$20) and a modified available base limit value 1308*d* (e.g., $30). Indeed, the modified transaction value limit 1306*d* can indicate that the secured credit account is overspent by $20.

Additionally, as shown in FIG. 13B, the dynamic base limit value allocation system 106 detects a third digital transaction and provides, for display within the graphical user interface 1304*e* of the client device 1302*e*, a digital transaction 1318 (e.g., a transaction with a gas station of −$30). Moreover, upon determining that the transaction value of the digital transaction 1318 exceeds the modified transaction value limit 1306*d* (e.g., of −$20), the dynamic base limit value allocation system 106 utilizes the modified available base limit value 1308*d* (e.g., $30) to fulfill the digital transaction 1318. Accordingly, as shown in FIG. 13B, the dynamic base limit value allocation system 106 displays, within the graphical user interface 1304*e*, a modified transaction value limit 1306*e* (e.g., −$50 to indicate that the secured credit account is overspent by $20) and a modified transaction value limit 1308*e* (e.g., $0). In some cases, when additional digital transactions exceed both the transaction value limit the available base limit value, the dynamic base limit value allocation system 106 can reject additional digital transactions (in accordance with one or more implementations herein).

Moreover, as shown in FIG. 13B, the dynamic base limit value allocation system 106 detects an additional deposit transaction and provides, for display within the graphical user interface 1304*f* of the client device 1302*f*, a deposit transaction 1320 (e.g., a deposit from another transaction account of $200). In addition, as shown in FIG. 13B, the dynamic base limit value allocation system 106 also updates and displays a modified transaction value limit **1306*f* (e.g., $150) in response to the detected deposit transaction 1320. Indeed, in one or more instances, the dynamic base limit value allocation system 106 modifies the transaction value limit by adding or increasing the transaction value limit by the deposited value after reinstating (or replenishing) a utilized available base limit value. In the example of FIG. 13B, the dynamic base limit value allocation system 106 reinstates the available base limit value by $50 (from $0) utilizing the deposit transaction 1320 to display a modified available base limit value 1308*f* (e.g., $50). Moreover, as shown in FIG. 13B, the dynamic base limit value allocation system 106 then utilizes the remainder of the deposit transaction 1320 (e.g., $150) to modify the transaction value limit and displays the modified transaction value limit 1306*f*** (e.g., $150 to indicate that the secured credit account has $150 to spend).

In one or more embodiments, the dynamic base limit value allocation system 106 further modifies the available base limit value for the secured credit account based on activities (or digital transactions) within one or more connected accounts. For example, FIG. 13C illustrates the dynamic base limit value allocation system 106 modifying the universally accessible available base limit value across multiple connected accounts of a user account. Indeed, as shown in the transition from FIG. 13B to FIG. 13C, the dynamic base limit value allocation system 106 receives from one or more of the transaction accounts (e.g., transaction accounts 1-N) of the user account 1322 an updated available base limit value 1324. Indeed, the dynamic base limit value allocation system 106 can determine the updated available base limit value 1324 based on digital transactions in the other transaction accounts 1-N in accordance with one or more implementations herein.

As further shown in FIG. 13C, the dynamic base limit value allocation system 106 utilizes the updated available base limit value 1324 to provide, for display within a graphical user interface **1304*g* of the client device 1302*g*, a modified available base limit value 1308*g*. Indeed, as shown in the transition from FIG. 13B to FIG. 13C, the dynamic base limit value allocation system 106 displays the modified available base limit value 1308*g* (e.g., $25 instead of $50 from the modified available base limit value 1308*f*) based on the updated available base limit value 1324 from the one or more of the transaction accounts 1-N. Indeed, as shown in FIG. 13C, the dynamic base limit value allocation system 106 displays the modified available base limit value 1308*g* within the graphical user interface 1304*g*** without updates to the transaction value limit and/or additional digital transactions in the secured credit account.

In one or more embodiments, the dynamic base limit value allocation system 106 also modifies the available base limit value for the secured credit account based on activities (or digital transactions) within one or more connected accounts and the secured credit account. For example, FIG. 13D illustrates the dynamic base limit value allocation system 106 modifying the universally accessible available base limit value across multiple connected accounts of a user account and the secured credit account.

Figure 13D:
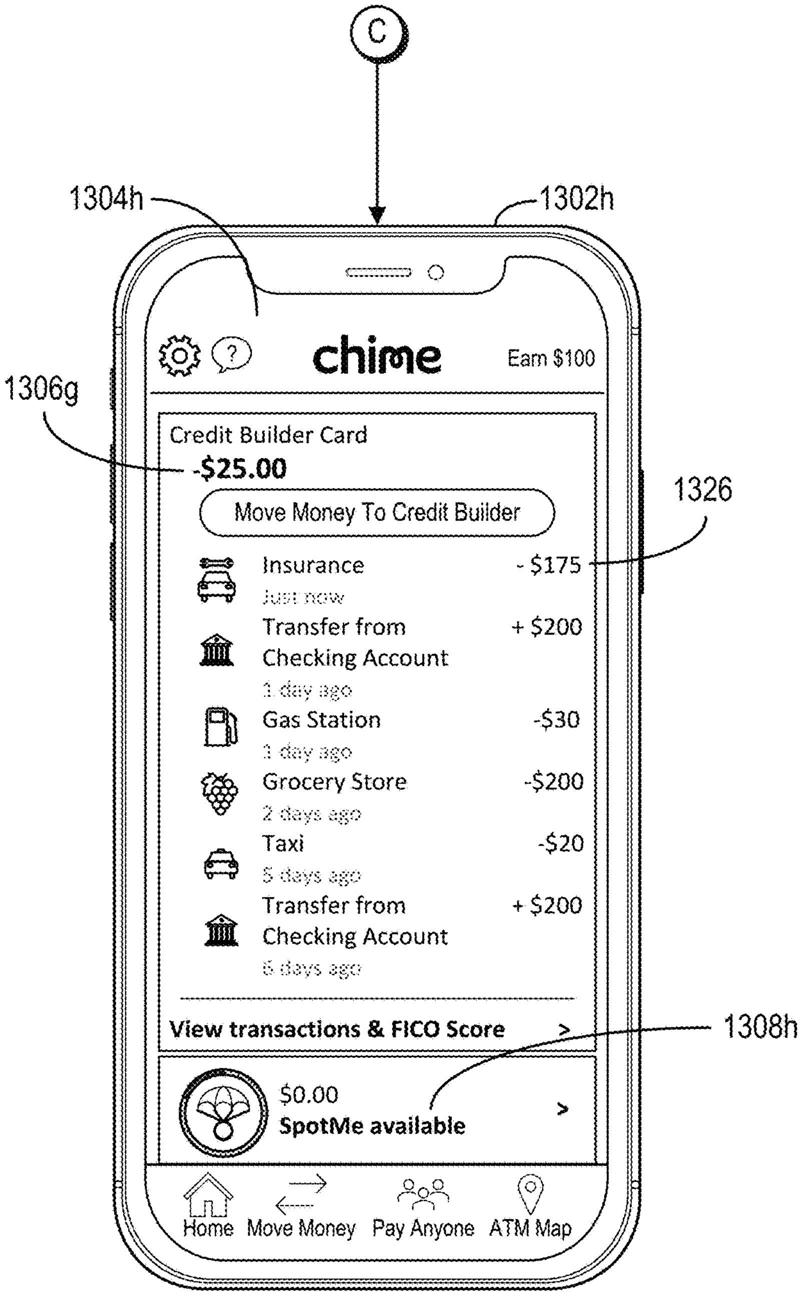

Indeed, as shown in the transition from FIG. 13C to FIG. 13D, the dynamic base limit value allocation system 106 detects an additional digital transaction and provides, for display within the graphical user interface **1304*h* of the client device 1302*h*, a digital transaction 1326 (e.g., a transaction with an insurance provider of -$175). Moreover, in FIG. 13D, upon determining that the transaction value of the digital transaction 1326 exceeds the transaction value limit (e.g., of $150 from FIG. 13C), the dynamic base limit value allocation system 106 utilizes the transaction value limit to cover a portion of the digital transaction 1326. Furthermore, the dynamic base limit value allocation system 106 utilizes the available base limit value 1308*g* (from FIG. 13C) to fulfill a remainder of between the transaction value limit (e.g., of $150) and the digital transaction 1326 (e.g., a remainder of $25 to cover the digital transaction of $175 after a transaction value limit of $150). Accordingly, as shown in FIG. 13D, the dynamic base limit value allocation system 106 displays, within the graphical user interface 1304*h*, a modified transaction value limit 1306*g* (e.g., -$25) and a modified available base limit value 1308*h* (e.g., $0). Indeed, the modified transaction value limit 1306*g*** can indicate that the secured credit account is overspent by $25.

Although one or more embodiments herein illustrate particular monetary amounts for the available base limit value, base limit value, transaction value limits, and/or digital transactions, the dynamic base limit value allocation system 106 can determine, utilize, and/or display various monetary amounts (or other values) for the available base limit value, base limit value, transaction value limits, and/or digital transactions. Furthermore, although one or more embodiments herein illustrate a particular order of digital transactions, deposit transactions, and/or utilizations of the transaction value limits and/or the available base limit values, the dynamic base limit value allocation system 106 can receive digital transactions, deposit transactions, and/or utilizations of the transaction value limits and/or the available base limit value in various combinations and/or orders in accordance with one or more implementations herein.

Moreover, although one or more embodiments herein illustrate the dynamic base limit value allocation system 106 displaying an available base limit value, the dynamic base limit value allocation system 106 can also display a base value limit maximum accessible to a user account (e.g., the total base value limit accessible to the user account when the user account is not actively utilizing any amount of the available base limit value). Furthermore, in some cases, the dynamic base limit value allocation system 106 can also display a combined amount that indicates a total available to spend within a secured credit account that includes a transaction value limit (e.g., a balance available in a secured deposit account), an amount to deduct from a secured credit account (e.g., unsettled credit transactions), and an available base limit value (e.g., a base limit value available to the user deducted by a base limit value utilized by the secured credit account and/or one or more other transaction accounts).

Figure 14:
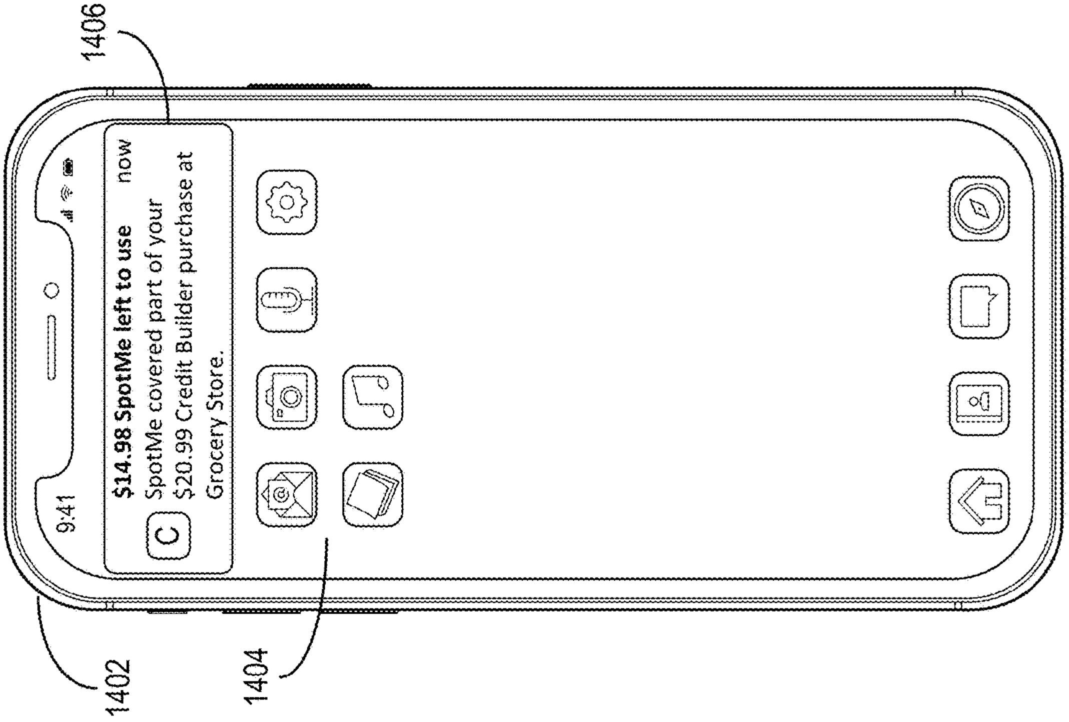
FIG. 14 illustrates a dynamic base limit value allocation system displaying a notification indicating a utilization of an available base limit value in accordance with one or more implementations.

Additionally, in one or more instances, the dynamic base limit value allocation system 106 generates notifications to display one or more modifications to an available base limit value when a digital transaction is detected within a secured credit account. For instance, FIG. 14 illustrates the dynamic base limit value allocation system 106 displaying a notification indicating a utilization of an available base limit value. For instance, as shown in FIG. 14, the dynamic base limit value allocation system 106 provides, for display within a graphical user interface 1404 of a client device 1402, an electronic notification 1406 indicating utilization of the available base limit value (e.g., "SpotMe covered part of your $20.99 Credit Builder purchase at Grocery Store") and a modified available base limit value resulting from the digital transaction (e.g., "$14.98 SpotMe left to use"). In some cases, the dynamic base limit value allocation system 106 can also indicate a modified transaction value limit for the secured credit amount within the electronic notification. Although FIG. 14 illustrates the dynamic base limit value allocation system 106 displaying an electronic popup notification, the dynamic base limit value allocation system 106 can generate and display various types of notifications for the utilization of the available base limit value, such as, but not limited to, e-mails and/or text messages.

Furthermore, in one or more embodiments, the dynamic base limit value allocation system 106 enables authorizing digital transactions that exceed a transaction value limit and an available base limit value. In some cases, the dynamic base limit value allocation system 106 authorizes one or more digital transaction that exceed a transaction value limit and an available base limit value and indicates, within a graphical user interface, the exceeded transaction amount. In some cases, the dynamic base limit value allocation system 106 facilitates the exceeded transaction amounts as a line of credit (e.g., with a past due date and/or a credit reporting mechanism). Upon receiving a deposit transaction and/or a user interaction to transfer funds to the secured credit account, the dynamic base limit value allocation system 106 can apply the deposit transaction and/or transferred funds to the exceeded transaction amounts, then reinstate utilized available base limit value via the deposit transaction and/or transferred funds, and subsequently increase the transaction value limit with remainder amount from the deposit transaction and/or transferred funds.

Figure 15:
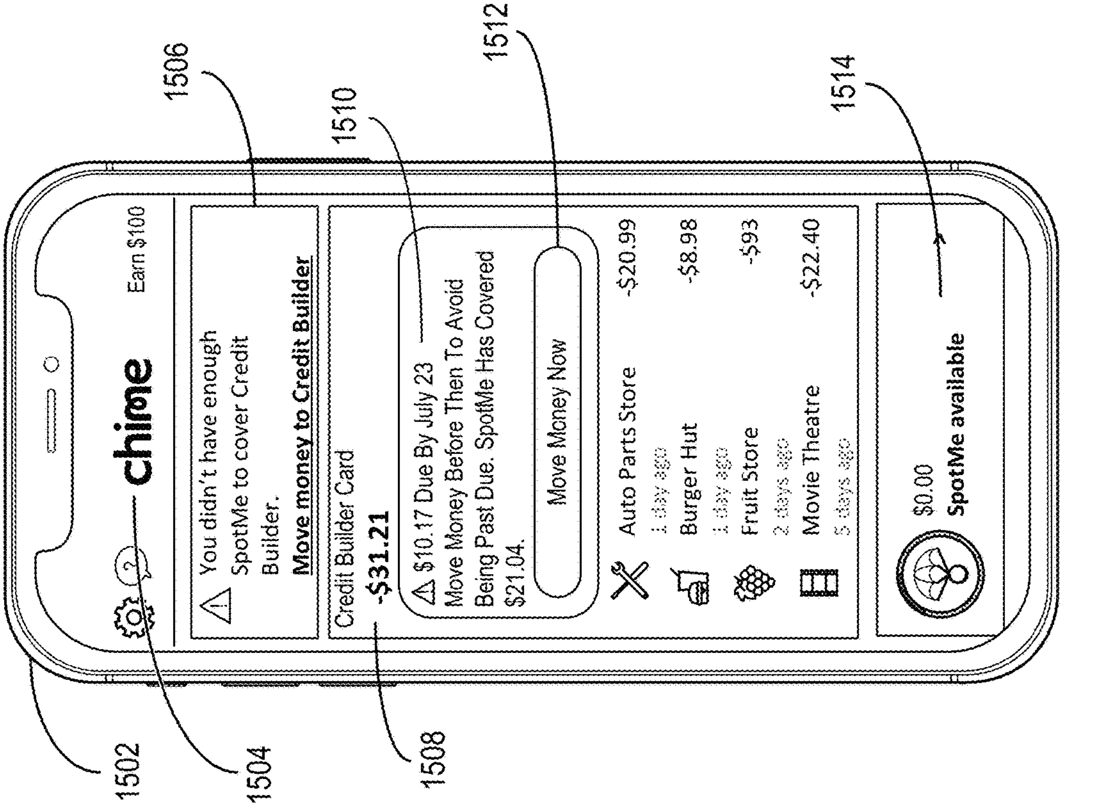
FIG. 15 illustrates a dynamic base limit value allocation system facilitating and displaying digital transactions that exceed a transaction value limit and an available base limit value in accordance with one or more implementations.

For instance, FIG. 15 illustrates the dynamic base limit value allocation system 106 facilitating and displaying digital transactions that exceed a transaction value limit and an available base limit value. For instance, as shown in FIG. 15, the dynamic base limit value allocation system 106 provides, for display within a graphical user interface 1504 of a client device 1502, a notification indicator 1506 to indicate that one or more digital transactions exceed a transaction value limit and an available base limit value corresponding to a secured credit account. Furthermore, as shown in FIG. 15, the dynamic base limit value allocation system 106 displays, within the graphical user interface 1504, an exceeded transaction amount 1510 (with a past due date deadline) and an indication for a utilized amount of the available base limit value (e.g., "SpotMe has covered $21.04").

Additionally, as shown in FIG. 15, the dynamic base limit value allocation system 106 displays a selectable user interface element 1512 to initiate a deposit transaction and/or fund transfer to pay the exceeded transaction amount in accordance with one or more implementations herein. In addition, as shown in FIG. 15, the dynamic base limit value allocation system 106 also displays a modified transaction value limit 1508 and a modified available base limit value 1514 in accordance with one or more implementations herein.

Figure 16:
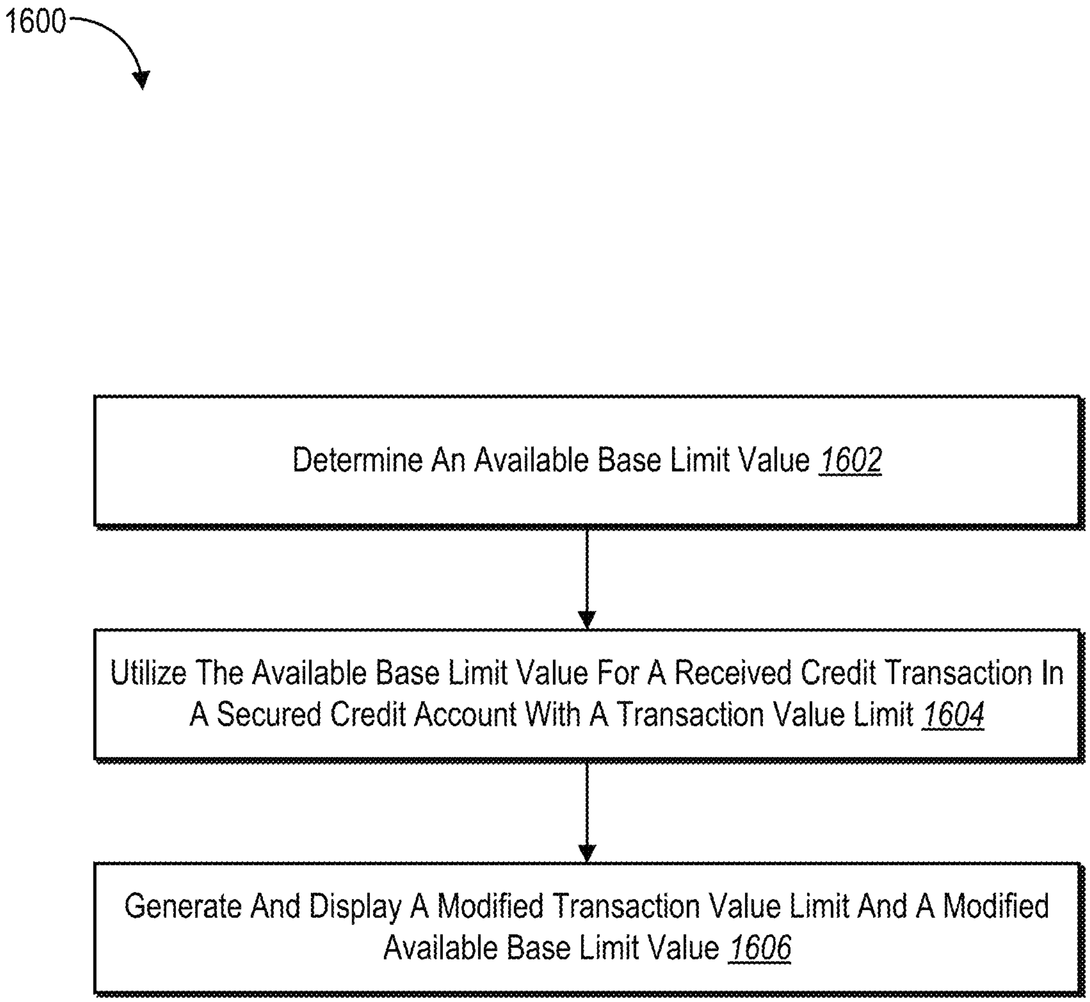
FIG. 16 illustrates a flowchart of a series of acts for displaying transaction value limits and base limit values in a secured credit account in accordance with one or more implementations.

Turning now to FIG. 16, this figure shows a flowchart of a series of acts 1600 for displaying transaction value limits and base limit values in a secured credit account in accordance with one or more implementations. While FIG. 16 illustrates acts according to one embodiment, alternative embodiments may omit, add to, reorder, and/or modify any of the acts shown in FIG. 16. The acts of FIG. 16 can be performed as part of a method. Alternatively, a non-transitory computer readable storage medium can comprise instructions that, when executed by the one or more processors, cause a computing device to perform the acts depicted in FIG. 16. In still further embodiments, a system can perform the acts of FIG. 16.

As shown in FIG. 16, the series of acts 1600 include an act 1602 of determining an available base limit value, an act 1604 of utilizing the available base limit value for a received credit transaction in a secured credit account with a transaction value limit, and an act 1606 of generating and displaying a modified transaction value limit and a modified available base limit value.

In some cases, the act 1602 includes determining, utilizing a machine learning model, a base limit value or a user account based on one or more user activities, wherein the base limit value represents an excess utilization buffer for the user account and determining, for the user account, an available base limit value based on the base limit value, the act 1604 includes receiving, for the user account, a credit transaction corresponding to a secured credit account with a transaction value limit based on a deposited value within the secured credit account and, upon detecting that a transaction value of the credit transaction is greater than the transaction value limit, utilizing the available base limit value corresponding to the user account to fulfill a remainder between the transaction value and the transaction value limit, and the act 1606 includes generating a modified transaction value limit and a modified available base limit value for the user account based on the utilization of the available base limit value and providing, for display within a graphical user interface, the modified transaction value limit and the modified available base limit value.

In some cases, the series of acts 1600 include receiving an additional credit transaction corresponding to the secured credit account. Moreover, the series of acts 1600 can include authorizing the additional credit transaction for the user account (based on an additional transaction value of the additional credit transaction) by comparing an additional transaction value of the additional credit transaction to the modified transaction value limit and the modified available base limit value. Additionally, the series of acts 1600 can include authorizing the additional credit transaction (based on an additional transaction value of the additional credit transaction) by accepting the additional credit transaction upon detecting that the additional transaction value does not exceed a combination of the modified transaction value limit and the modified available base limit value and/or rejecting the additional credit transaction upon detecting that the additional transaction value exceeds the combination of the modified transaction value limit and the modified available base limit value.

Moreover, the series of acts 1600 can include determining, for the user account, the available base limit value based on the base limit value, one or more credit transactions corresponding to the secured credit account, and one or more transactions corresponding to an additional transaction account of the user account.

Furthermore, the series of acts 1600 can include generating the modified available base limit value based on the remainder between the transaction value and the transaction value limit from the available base limit value.

Additionally, the series of acts 1600 can include detecting a transaction corresponding to an additional transaction account of the user account. For example, the additional transaction account can be different from the secured credit account. Moreover, the series of acts 1600 an include generating an updated modified available base limit value based on the transaction. In addition, the series of acts 1600 can include providing, for display within the graphical user interface, the modified transaction value limit and the updated modified available base limit value.

Furthermore, the series of acts 1600 can include detecting a deposit transaction within one or more transaction accounts corresponding to the user account. Moreover, the series of acts 1600 can include generating, utilizing the deposit transaction, an updated modified available base limit value for the user account. In some implementations, the series of acts 1600 include providing, for display within the graphical user interface, the modified transaction value limit and the updated modified available base limit value. In some instances, the series of acts 1600 include detecting an additional deposited value within the secured credit account, generating, utilizing the additional deposited value, an updated modified transaction value limit and an updated modified available base limit value, and providing, for display within the graphical user interface, the updated modified transaction value limit and the updated modified available base limit value.

In one or more embodiments, the series of acts 1600 include detecting an additional deposited value within the secured credit account and generating, utilizing the additional deposited value, an updated modified transaction value limit by combining the additional deposited value and the modified transaction value limit.

Furthermore, the series of acts 1600 can include providing, for display within an additional graphical user interface, one or more selectable user interface elements to select, for access to the available base limit value, the secured credit account or one or more additional transaction accounts. Moreover, the series of acts 1600 can include, upon receiving a user selection of a selectable user interface element corresponding to the secured credit account and an additional transaction account from the one or more additional transaction accounts, enabling the available base limit value for the secured credit account and the additional transaction account.

Additionally, the series of acts 1600 can include providing, for display within an additional graphical user interface, a user interface element indicating utilization of the available base limit value for the credit transaction and an additional user interface element indicating an amount of the available base limit value utilized based on the remainder between the transaction value and the transaction value limit.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 17:
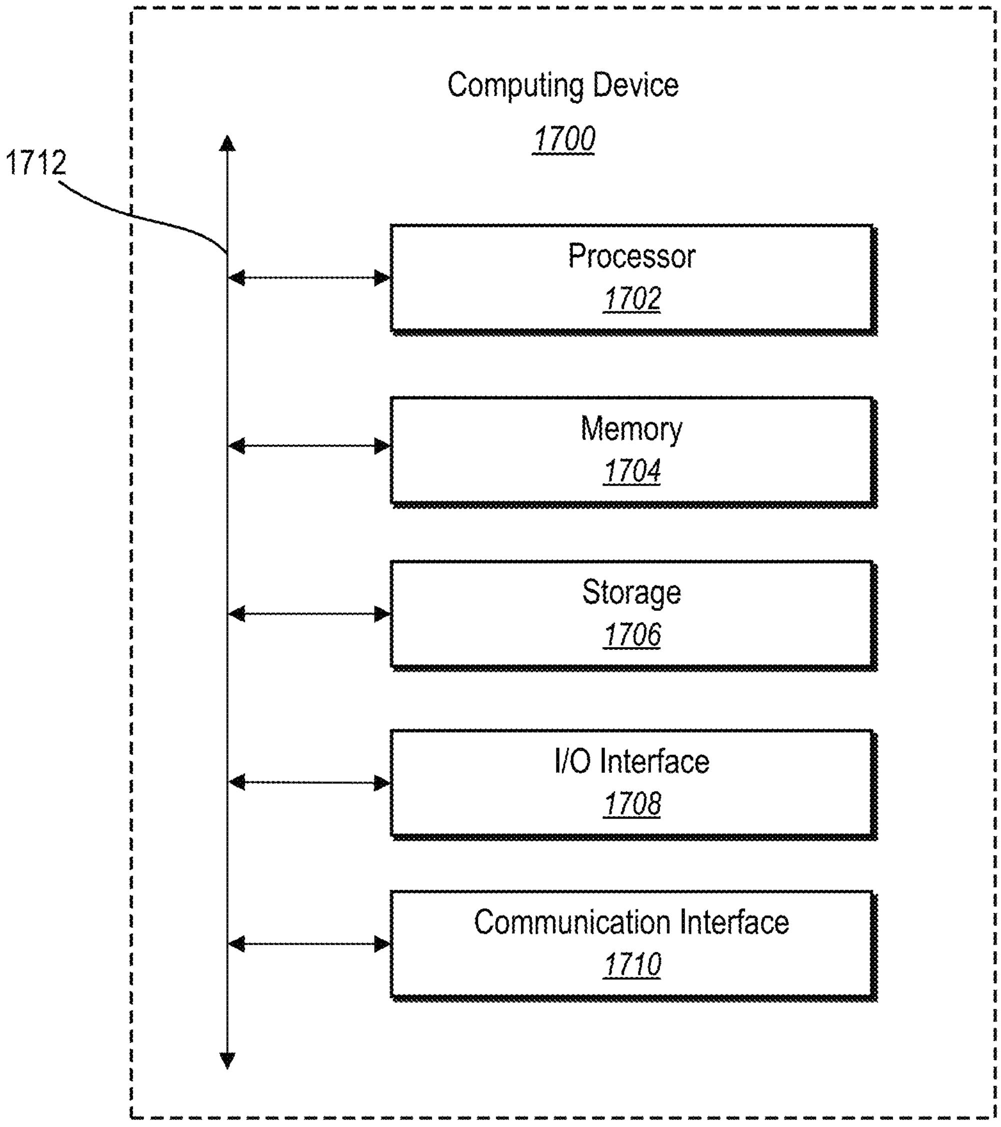
FIG. 17 illustrates a block diagram of an exemplary computing device in accordance with one or more implementations.

FIG. 17 illustrates, in block diagram form, an exemplary computing device 1700 that may be configured to perform one or more of the processes described above. One will appreciate that the dynamic base limit value allocation system 106 (or the inter-network facilitation system 104) can comprise implementations of a computing device, including, but not limited to, the devices or systems illustrated in the previous figures. As shown by FIG. 17, the computing device can comprise a processor 1702, memory 1704, a storage device 1706, an I/O interface 1708, and a communication interface 1710. In certain embodiments, the computing device 1700 can include fewer or more components than those shown in FIG. 17. Components of computing device 1700 shown in FIG. 17 will now be described in additional detail.

In particular embodiments, processor(s) 1702 includes hardware for executing instructions, such as those making up a computer program. As an example, and not by way of limitation, to execute instructions, processor(s) 1702 may retrieve (or fetch) the instructions from an internal register, an internal cache, memory 1704, or a storage device 1706 and decode and execute them.

The computing device 1700 includes memory 1704, which is coupled to the processor(s) 1702. The memory 1704 may be used for storing data, metadata, and programs for execution by the processor(s). The memory 1704 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1704 may be internal or distributed memory.

The computing device 1700 includes a storage device 1706 includes storage for storing data or instructions. As an example, and not by way of limitation, storage device 1706 can comprise a non-transitory storage medium described above. The storage device 1706 may include a hard disk drive ("HDD"), flash memory, a Universal Serial Bus ("USB") drive or a combination of these or other storage devices.

The computing device 1700 also includes one or more input or output ("I/O") interface 1708, which are provided to allow a user (e.g., requester or provider) to provide input to (such as user strokes), receive output from, and otherwise transfer data to and from the computing device 1700. These I/O interface 1708 may include a mouse, keypad or a keyboard, a touch screen, camera, optical scanner, network interface, modem, other known I/O devices or a combination of such I/O interface 1708. The touch screen may be activated with a stylus or a finger.

The I/O interface 1708 may include one or more devices for presenting output to a user, including, but not limited to, a graphics engine, a display (e.g., a display screen), one or more output providers (e.g., display providers), one or more audio speakers, and one or more audio providers. In certain embodiments, the I/O interface 1708 is configured to provide graphical data to a display for presentation to a user. The graphical data may be representative of one or more graphical user interfaces and/or any other graphical content as may serve a particular implementation.

The computing device 1700 can further include a communication interface 1710. The communication interface 1710 can include hardware, software, or both. The communication interface 1710 can provide one or more interfaces for communication (such as, for example, packet-based communication) between the computing device and one or more other computing devices 1700 or one or more networks. As an example, and not by way of limitation, communication interface 1710 may include a network interface controller ("NIC") or network adapter for communicating with an Ethernet or other wire-based network or a wireless NIC ("WNIC") or wireless adapter for communicating with a wireless network, such as a WI-FI. The computing device 1700 can further include a bus 1712. The bus 1712 can comprise hardware, software, or both that couples components of computing device 1700 to each other.

Figure 18:
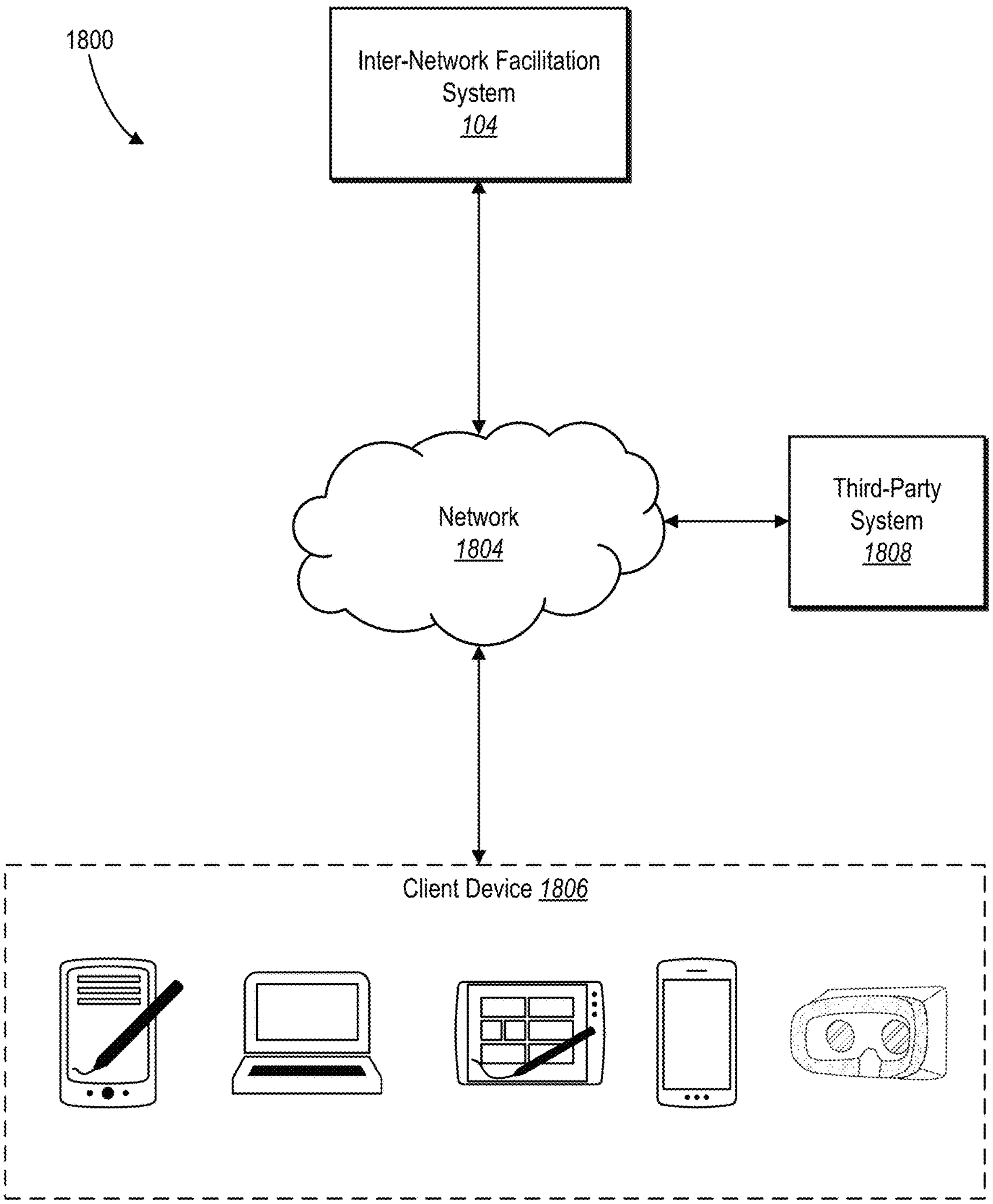
FIG. 18 illustrates an example environment for an inter-network facilitation system in accordance with one or more implementations.

FIG. 18 illustrates an example network environment 1800 of the inter-network facilitation system 104. The network environment 1800 includes a client device 1806 (e.g., client device 110), an inter-network facilitation system 104, and a third-party system 1808 connected to each other by a network 1804. Although FIG. 18 illustrates a particular arrangement of the client device 1806, the inter-network facilitation system 104, the third-party system 1808, and the network 1804, this disclosure contemplates any suitable arrangement of client device 1806, the inter-network facilitation system 104, the third-party system 1808, and the network 1804. As an example, and not by way of limitation, two or more of client device 1806, the inter-network facilitation system 104, and the third-party system 1808 communicate directly, bypassing network 1804. As another example, two or more of client device 1806, the inter-network facilitation system 104, and the third-party system 1808 may be physically or logically co-located with each other in whole or in part.

Moreover, although FIG. 18 illustrates a particular number of client devices 1806, inter-network facilitation system 104, third-party systems 1808, and networks 1804, this disclosure contemplates any suitable number of client devices 1806, FIG. 18, third-party systems 1808, and networks 1804. As an example, and not by way of limitation, network environment 1800 may include multiple client devices 1806, inter-network facilitation system 104, third-party systems 1808, and/or networks 1804.

This disclosure contemplates any suitable network 1804. As an example, and not by way of limitation, one or more portions of network 1804 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1804 may include one or more networks 1804.

Links may connect client device 1806, inter-network facilitation system 104 (e.g., which hosts the dynamic base limit value allocation system 106), and third-party system 1808 to network 1804 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1800. One or more first links may differ in one or more respects from one or more second links.

In particular embodiments, the client device 1806 may be an electronic device including hardware, software, or embedded logic components or a combination of two or more such components and capable of carrying out the appropriate functionalities implemented or supported by client device 1806. As an example, and not by way of limitation, a client device 1806 may include any of the computing devices discussed above in relation to FIG. 17. A client device 1806 may enable a network user at the client device 1806 to access network 1804. A client device 1806 may enable its user to communicate with other users at other client devices 1806.

In particular embodiments, the client device 1806 may include a requester application or a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at the client device 1806 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 1806 one or more Hyper Text Markup Language ("HTML") files responsive to the HTTP request. The client device 1806 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, inter-network facilitation system 104 may be a network-addressable computing system that can interface between two or more computing networks or servers associated with different entities such as financial institutions (e.g., banks, credit processing systems, ATM systems, or others). In particular, the inter-network facilitation system 104 can send and receive network communications (e.g., via the network 1804) to link the third-party-system 1808. For example, the inter-network facilitation system 104 may receive authentication credentials from a user to link a third-party system 1808 such as an online bank account, credit account, debit account, or other financial account to a user account within the inter-network facilitation system 104. The inter-network facilitation system 104 can subsequently communicate with the third-party system 1808 to detect or identify balances, transactions, withdrawal, transfers, deposits, credits, debits, or other transaction types associated with the third-party system 1808. The inter-network facilitation system 104 can further provide the aforementioned or other financial information associated with the third-party system 1808 for display via the client device 1806. In some cases, the inter-network facilitation system 104 links more than one third-party system 1808, receiving account information for accounts associated with each respective third-party system 1808 and performing operations or transactions between the different systems via authorized network connections.

In particular embodiments, the inter-network facilitation system 104 may interface between an online banking system and a credit processing system via the network 1804. For example, the inter-network facilitation system 104 can provide access to a bank account of a third-party system 1808 and linked to a user account within the inter-network facilitation system 104. Indeed, the inter-network facilitation system 104 can facilitate access to, and transactions to and from, the bank account of the third-party system 1808 via a client application of the inter-network facilitation system 104 on the client device 1806. The inter-network facilitation system 104 can also communicate with a credit processing system, an ATM system, and/or other financial systems (e.g., via the network 1804) to authorize and process credit charges to a credit account, perform ATM transactions, perform transfers (or other transactions) across accounts of different third-party systems 1808, and to present corresponding information via the client device 1806.

In particular embodiments, the inter-network facilitation system 104 includes a model for approving or denying transactions. For example, the inter-network facilitation system 104 includes a transaction approval machine learning model that is trained based on training data such as user account information (e.g., name, age, location, and/or income), account information (e.g., current balance, average balance, maximum balance, and/or minimum balance), credit usage, and/or other transaction history. Based on one or more of these data (from the inter-network facilitation system 104 and/or one or more third-party systems 1808), the inter-network facilitation system 104 can utilize the transaction approval machine learning model to generate a prediction (e.g., a percentage likelihood) of approval or denial of a transaction (e.g., a withdrawal, a transfer, or a purchase) across one or more networked systems.

The inter-network facilitation system 104 may be accessed by the other components of network environment 1800 either directly or via network 1804. In particular embodiments, the inter-network facilitation system 104 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, the inter-network facilitation system 104 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1806, or an inter-network facilitation system 104 to manage, retrieve, modify, add, or delete, the information stored in a data store.

In particular embodiments, the inter-network facilitation system 104 may provide users with the ability to take actions on various types of items or objects, supported by the inter-network facilitation system 104. As an example, and not by way of limitation, the items and objects may include financial institution networks for banking, credit processing, or other transactions, to which users of the inter-network facilitation system 104 may belong, computer-based applications that a user may use, transactions, interactions that a user may perform, or other suitable items or objects. A user may interact with anything that is capable of being represented in the inter-network facilitation system 104 or by an external system of a third-party system, which is separate from inter-network facilitation system 104 and coupled to the inter-network facilitation system 104 via a network 1804.

In particular embodiments, the inter-network facilitation system 104 may be capable of linking a variety of entities. As an example, and not by way of limitation, the inter-network facilitation system 104 may enable users to interact with each other or other entities, or to allow users to interact with these entities through an application programming interfaces ("API") or other communication channels.

In particular embodiments, the inter-network facilitation system 104 may include a variety of servers, sub-systems, programs, modules, logs, and data stores. In particular embodiments, the inter-network facilitation system 104 may include one or more of the following: a web server, action logger, API-request server, transaction engine, cross-institution network interface manager, notification controller, action log, third-party-content-object-exposure log, inference module, authorization/privacy server, search module, user-interface module, user-profile (e.g., provider profile or requester profile) store, connection store, third-party content store, or location store. The inter-network facilitation system 104 may also include suitable components such as network interfaces, security mechanisms, load balancers, failover servers, management-and-network-operations consoles, other suitable components, or any suitable combination thereof. In particular embodiments, the inter-network facilitation system 104 may include one or more user-profile stores for storing user profiles for transportation providers and/or transportation requesters. A user profile may include, for example, biographic information, demographic information, financial information, behavioral information, social information, or other types of descriptive information, such as interests, affinities, or location.

The web server may include a mail server or other messaging functionality for receiving and routing messages between the inter-network facilitation system 104 and one or more client devices 1806. An action logger may be used to receive communications from a web server about a user's actions on or off the inter-network facilitation system 104. In conjunction with the action log, a third-party-content-object log may be maintained of user exposures to third-party-content objects. A notification controller may provide information regarding content objects to a client device 1806. Information may be pushed to a client device 1806 as notifications, or information may be pulled from client device 1806 responsive to a request received from client device 1806. Authorization servers may be used to enforce one or more privacy settings of the users of the inter-network facilitation system 104. A privacy setting of a user determines how particular information associated with a user can be shared. The authorization server may allow users to opt in to or opt out of having their actions logged by the inter-network facilitation system 104 or shared with other systems, such as, for example, by setting appropriate privacy settings. Third-party-content-object stores may be used to store content objects received from third parties. Location stores may be used for storing location information received from client devices 1806 associated with users.

In addition, the third-party system 1808 can include one or more computing devices, servers, or sub-networks associated with internet banks, central banks, commercial banks, retail banks, credit processors, credit issuers, ATM systems, credit unions, loan associates, brokerage firms, linked to the inter-network facilitation system 104 via the network 1804. A third-party system 1808 can communicate with the inter-network facilitation system 104 to provide financial information pertaining to balances, transactions, and other information, whereupon the inter-network facilitation system 104 can provide corresponding information for display via the client device 1806. In particular embodiments, a third-party system 1808 communicates with the inter-network facilitation system 104 to update account balances, transaction histories, credit usage, and other internal information of the inter-network facilitation system 104 and/or the third-party system 1808 based on user interaction with the inter-network facilitation system 104 (e.g., via the client device 1806). Indeed, the inter-network facilitation system 104 can synchronize information across one or more third-party systems 1808 to reflect accurate account information (e.g., balances, transactions, etc.) across one or more networked systems, including instances where a transaction (e.g., a transfer) from one third-party system 1808 affects another third-party system 1808.

In the foregoing specification, the invention has been described with reference to specific exemplary embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

determining a base limit value for a user account indicating an excess utilization buffer for the user account by:

selecting, utilizing a user activity duration corresponding to the user account, an activity machine learning model from a plurality of activity machine learning models, wherein each of the plurality of activity machine learning models comprise learned parameters specific to different sets of user activity training data from different groupings of user accounts, wherein each of the plurality of activity machine learning models is trained based on different sets of user activity training data from different groupings of user accounts corresponding to particular user activity durations by:

generating, utilizing the plurality of activity machine learning models according to the particular user activity durations, predicted activity scores for the user accounts, determining loss values indicating accuracies of the predicted activity scores by comparing the predicted activity scores to the different sets of user activity training data of the user accounts, and modifying parameters of the plurality of activity machine learning models based on the loss values;

generating an activity score utilizing the activity machine learning model from user activity data of the user account; and utilizing the activity score with a base limit value model to determine the base limit value;

determining, for the user account, an available base limit value based on the base limit value;

receiving, for the user account, a credit transaction corresponding to a secured credit account with a transaction value limit based on a deposited value within the secured credit account;

upon detecting that a transaction value of the credit transaction is greater than the transaction value limit, utilizing the available base limit value corresponding to the user account to fulfill a remainder between the transaction value and the transaction value limit;

generating a modified transaction value limit and a modified available base limit value for the user account based on the utilization of the available base limit value;

providing, for display within a graphical user interface, the modified transaction value limit and the modified available base limit value;

determining a second base limit value for the user account indicating an additional excess utilization buffer for the user account by utilizing a second activity machine learning model from the plurality of activity machine learning models selected based on an updated user account activity duration corresponding to the user account;

determining, for the user account, a second available base limit value based on the second base limit value; and providing the second available base limit value for display within the graphical user interface.

2. The computer-implemented method of claim 1, further comprising:

receiving an additional credit transaction corresponding to the secured credit account; and authorizing the additional credit transaction for the user account by comparing an additional transaction value of the additional credit transaction to the modified transaction value limit and the modified available base limit value.

3. The computer-implemented method of claim 2, further comprising authorizing the additional credit transaction by:

accepting the additional credit transaction upon detecting that the additional transaction value does not exceed a combination of the modified transaction value limit and the modified available base limit value; or rejecting the additional credit transaction upon detecting that the additional transaction value exceeds the combination of the modified transaction value limit and the modified available base limit value.

4. The computer-implemented method of claim 1, further comprising generating the modified available base limit value based on the remainder between the transaction value and the transaction value limit from the available base limit value.

5. The computer-implemented method of claim 1, further comprising:

detecting a transaction corresponding to an additional transaction account of the user account, wherein the additional transaction account is different from the secured credit account;

generating an updated modified available base limit value based on the transaction; and providing, for display within the graphical user interface, the modified transaction value limit and the updated modified available base limit value.

6. The computer-implemented method of claim 1, further comprising:

detecting a deposit transaction within one or more transaction accounts corresponding to the user account;

generating, utilizing the deposit transaction, an updated modified available base limit value for the user account; and providing, for display within the graphical user interface, the modified transaction value limit and the updated modified available base limit value.

7. The computer-implemented method of claim 1, further comprising:

detecting an additional deposited value within the secured credit account; and generating, utilizing the additional deposited value, an updated modified transaction value limit by combining the additional deposited value and the modified transaction value limit.

8. The computer-implemented method of claim 1, further comprising:

providing, for display within an additional graphical user interface, one or more selectable user interface elements to select, for access to the available base limit value, the secured credit account or one or more additional transaction accounts; and upon receiving a user selection of a selectable user interface element corresponding to the secured credit account and an additional transaction account from the one or more additional transaction accounts, enabling the available base limit value for the secured credit account and the additional transaction account.

9. The computer-implemented method of claim 1, further comprising providing, for display within an additional graphical user interface, a user interface element indicating utilization of the available base limit value for the credit transaction and an additional user interface element indicating an amount of the available base limit value utilized based on the remainder between the transaction value and the transaction value limit.

10. A non-transitory computer-readable medium storing instructions that, when executed by at least one processor, cause the at least one processor to perform operations comprising:

determining a base limit value for a user account indicating an excess utilization buffer for the user account by:

selecting, utilizing a user activity duration corresponding to the user account, an activity machine learning model from a plurality of activity machine learning models, wherein each of the plurality of activity machine learning models comprise learned parameters specific to different sets of user activity training data from different groupings of user accounts, wherein each of the plurality of activity machine learning models is trained based on different sets of user activity training data from different groupings of user accounts corresponding to particular user activity durations by:

generating, utilizing the plurality of activity machine learning models according to the particular user activity durations, predicted activity scores for the user accounts, determining loss values indicating accuracies of the predicted activity scores by comparing the predicted activity scores to the different sets of user activity training data of the user accounts, and modifying parameters of the plurality of activity machine learning models based on the loss values;

generating an activity score utilizing the activity machine learning model from user activity data of the user account; and utilizing the activity score with a base limit value model to determine the base limit value;

determining, for the user account, an available base limit value based on the base limit value;

receiving, for the user account, a credit transaction corresponding to a secured credit account with a transaction value limit based on a deposited value within the secured credit account;

upon detecting that a transaction value of the credit transaction is greater than the transaction value limit, utilizing the available base limit value corresponding to the user account to fulfill a remainder between the transaction value and the transaction value limit;

generating a modified transaction value limit and a modified available base limit value for the user account based on the utilization of the available base limit value;

providing, for display within a graphical user interface, the modified transaction value limit and the modified available base limit value;

determining a second base limit value for the user account indicating an additional excess utilization buffer for the user account by utilizing a second activity machine learning model from the plurality of activity machine learning models selected based on an updated user account activity duration corresponding to the user account;

determining, for the user account, a second available base limit value based on the second base limit value; and providing the second available base limit value for display within the graphical user interface.

11. The non-transitory computer-readable medium of claim 10, wherein the operations further comprise:

receiving an additional credit transaction corresponding to the secured credit account; and authorizing the additional credit transaction based on an additional transaction value of the additional credit transaction by:

accepting the additional credit transaction upon detecting that the additional transaction value does not exceed a combination of the modified transaction value limit and the modified available base limit value; or rejecting the additional credit transaction upon detecting that the additional transaction value exceeds the combination of the modified transaction value limit and the modified available base limit value.

12. The non-transitory computer-readable medium of claim 10, wherein the operations further comprise determining, for the user account, the available base limit value based on the base limit value, one or more credit transactions corresponding to the secured credit account, and one or more transactions corresponding to an additional transaction account of the user account.

13. The non-transitory computer-readable medium of claim 10, wherein the operations further comprise generating the modified available base limit value based on the remainder between the transaction value and the transaction value limit from the available base limit value.

14. The non-transitory computer-readable medium of claim 10, wherein the operations further comprise:

detecting an additional deposited value within the secured credit account; and generating, utilizing the additional deposited value, an updated modified transaction value limit by combining the additional deposited value and the modified transaction value limit.

15. A system comprising:

at least one processor; and at least one non-transitory computer-readable storage medium storing instructions that, when executed by the at least one processor, cause the system to:

determine a base limit value for a user account indicating an excess utilization buffer for the user account by:

selecting, utilizing a user activity duration corresponding to the user account, an activity machine learning model from a plurality of activity machine learning models, wherein each of the plurality of activity machine learning models comprise learned parameters specific to different sets of user activity training data from different groupings of user accounts, wherein each of the plurality of activity machine learning models is trained based on different sets of user activity training data from different groupings of user accounts corresponding to particular user activity durations by:

generating, utilizing the plurality of activity machine learning models according to the particular user activity durations, predicted activity scores for the user accounts, determining loss values indicating accuracies of the predicted activity scores by comparing the predicted activity scores to the different sets of user activity training data of the user accounts, and modifying parameters of the plurality of activity machine learning models based on the loss values;

generating an activity score utilizing the activity machine learning model from user activity data of the user account; and utilizing the activity score with a base limit value model to determine the base limit value;

determine, for the user account, an available base limit value based on the base limit value;

receive, for the user account, a credit transaction corresponding to a secured credit account with a transaction value limit based on a deposited value within the secured credit account;

upon detecting that a transaction value of the credit transaction is greater than the transaction value limit, utilize the available base limit value corresponding to the user account to fulfill a remainder between the transaction value and the transaction value limit;

generate a modified transaction value limit and a modified available base limit value for the user account based on the utilization of the available base limit value;

provide, for display within a graphical user interface, the modified transaction value limit and the modified available base limit value;

determine a second base limit value for the user account indicating an additional excess utilization buffer for the user account by utilizing a second activity machine learning model from the plurality of activity machine learning models selected based on an updated user account activity duration corresponding to the user account;

determine, for the user account, a second available base limit value based on the second base limit value; and provide the second available base limit value for display within the graphical user interface.

16. The system of claim 15, further comprising instructions that, when executed by the at least one processor, cause the system to:

receive an additional credit transaction corresponding to the secured credit account; and authorize the additional credit transaction for the user account by comparing an additional transaction value of the additional credit transaction to the modified transaction value limit and the modified available base limit value.

17. The system of claim 15, further comprising instructions that, when executed by the at least one processor, cause the system to determine, for the user account, the available base limit value based on the base limit value, one or more credit transactions corresponding to the secured credit account, and one or more transactions corresponding to an additional transaction account of the user account.

18. The system of claim 15, further comprising instructions that, when executed by the at least one processor, cause the system to:

detect a transaction corresponding to an additional transaction account of the user account, wherein the additional transaction account is different from the secured credit account;

generate an updated modified available base limit value based on the transaction; and provide, for display within the graphical user interface, the modified transaction value limit and the updated modified available base limit value.

19. The system of claim 15, further comprising instructions that, when executed by the at least one processor, cause the system to:

detect an additional deposited value within the secured credit account;

generate, utilizing the additional deposited value, an updated modified transaction value limit and an updated modified available base limit value; and provide, for display within the graphical user interface, the updated modified transaction value limit and the updated modified available base limit value.

* * * * *